(12) United States Patent
Nakashima

(10) Patent No.: US 12,387,314 B2
(45) Date of Patent: Aug. 12, 2025

(54) INSPECTION METHOD AND INSPECTION APPARATUS

(71) Applicant: Panasonic Intellectual Property Management Co., Ltd., Osaka (JP)

(72) Inventor: Shinya Nakashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 397 days.

(21) Appl. No.: 17/806,508

(22) Filed: Jun. 13, 2022

(65) Prior Publication Data

US 2022/0405904 A1    Dec. 22, 2022

(30) Foreign Application Priority Data

Jun. 21, 2021 (JP) ................. 2021-102333

(51) Int. Cl.
| | |
|---|---|
| *G06T 7/00* | (2017.01) |
| *G06T 5/80* | (2024.01) |
| *G06T 7/60* | (2017.01) |
| *G06V 10/24* | (2022.01) |
| *G06V 10/60* | (2022.01) |

(52) U.S. Cl.
CPC ............... *G06T 7/001* (2013.01); *G06T 5/80* (2024.01); *G06T 7/60* (2013.01); *G06V 10/24* (2022.01);
(Continued)

(58) Field of Classification Search
CPC .. G06T 7/001; G06T 5/80; G06T 7/60; G06T 2207/30108; G06T 2207/30168;
(Continued)

(56) References Cited

U.S. PATENT DOCUMENTS

2008/0055600 A1* 3/2008 Kawaguchi ........ G01N 21/8806
356/407
2017/0089841 A1* 3/2017 Uemura .................... G06T 5/50
(Continued)

FOREIGN PATENT DOCUMENTS

| JP | 2008-158597 | 7/2008 |
|---|---|---|
| JP | 2016-138789 | 8/2016 |

(Continued)

*Primary Examiner* — Jennifer Mehmood
*Assistant Examiner* — Pardis Sohraby
(74) *Attorney, Agent, or Firm* — Wenderoth, Lind & Ponack, L.L.P.

(57) ABSTRACT

An inspection apparatus includes an image sensor including a first imaging region and a reference imaging region. The first imaging region includes first pixels which capture an image of an object in a first wavelength band and output first feature quantities each of which corresponds to one of first pixels. The reference imaging region includes reference pixels which capture an image of the object in a reference wavelength band, which overlaps with the first wavelength band, and output reference feature quantities each of which corresponds to one of reference pixels. An image processing device obtains a reflectance of the object in the first wavelength band based on at least one first feature quantity and reference feature quantity and determines physical properties of the object based on the reflectance. The image processing device corrects the image of the object generated according to output from the image sensor based on the at least one first feature quantity and reference feature quantity.

9 Claims, 19 Drawing Sheets

(52) U.S. Cl.
CPC .... *G06V 10/60* (2022.01); *G06T 2207/30108* (2013.01); *G06T 2207/30168* (2013.01)

(58) Field of Classification Search
CPC ............ G06T 5/94; G06T 2207/10024; G06T 7/0004; G06T 2207/30148; G06V 10/24; G06V 10/60; G06V 10/143; G06V 10/25; G01N 21/47; G01N 21/88; G01B 11/00
USPC ........................................................ 382/141
See application file for complete search history.

(56) References Cited

U.S. PATENT DOCUMENTS

| | | | |
|---|---|---|---|
| 2017/0352133 A1* | 12/2017 | Toda | G06T 5/50 |
| 2018/0224333 A1* | 8/2018 | Sakakibara | G01J 3/2823 |
| 2019/0096057 A1* | 3/2019 | Allen | G06T 7/0008 |
| 2019/0347514 A1* | 11/2019 | Qin | G06F 18/22 |
| 2020/0364889 A1* | 11/2020 | Tsai | G01N 21/3581 |

FOREIGN PATENT DOCUMENTS

| | | | |
|---|---|---|---|
| JP | 2018-072180 | 5/2018 | |
| JP | 2019-052887 | 4/2019 | |
| JP | 2021-012392 | 2/2021 | |
| WO | WO-2019054016 A1 * | 3/2019 | |
| WO | WO-2020152866 A1 * | 7/2020 | ............ G01N 21/314 |
| WO | WO-2021033895 A1 * | 2/2021 | ......... G01N 21/8851 |

* cited by examiner

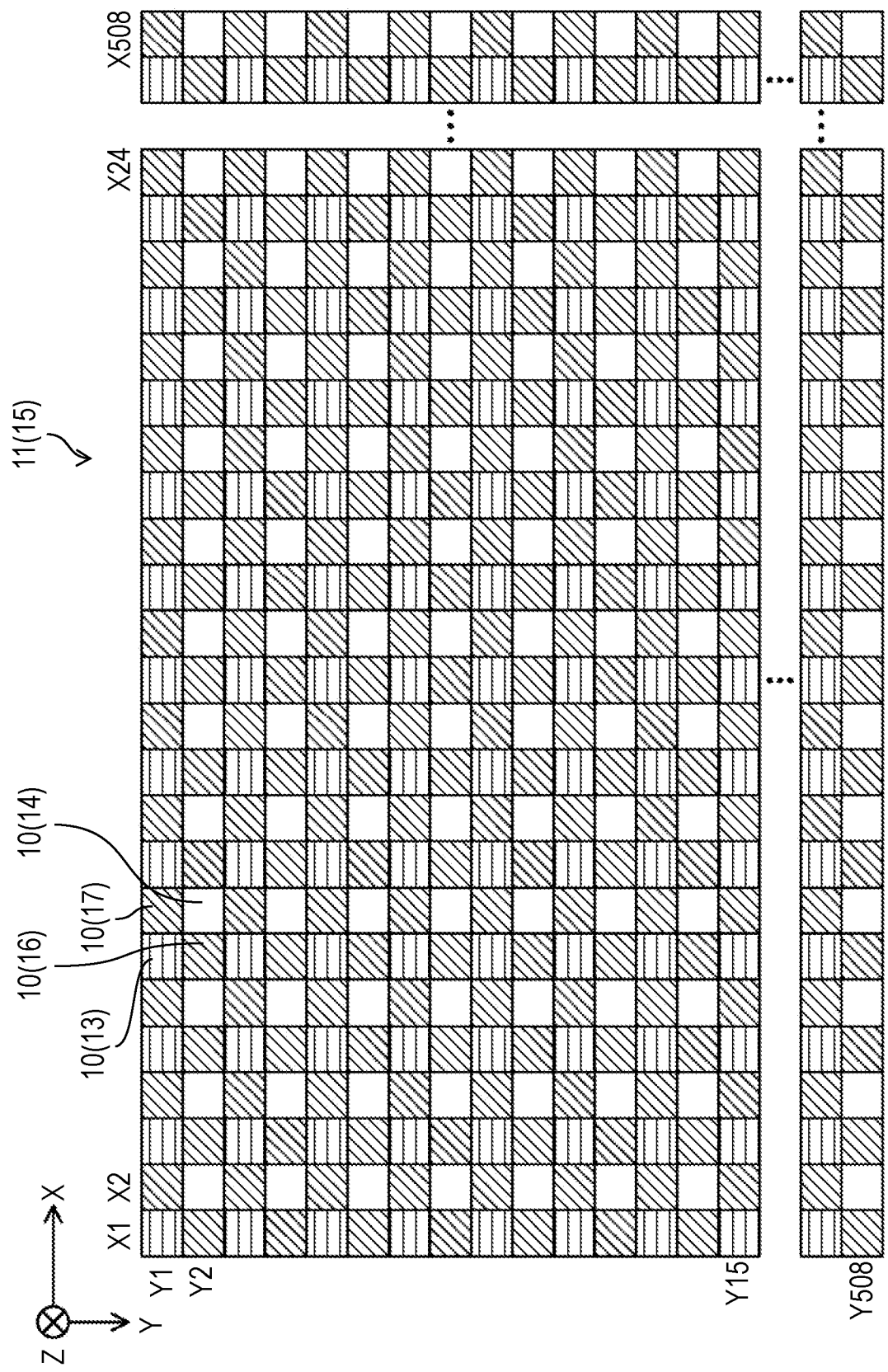

INSPECTION METHOD AND INSPECTION APPARATUS

BACKGROUND

1. Technical Field

The present disclosure relates to an inspection apparatus and an inspection method for an inspected body.

2. Description of the Related Art

In a device field such as semiconductors, electronic devices, or secondary batteries, an inspection apparatus is known which uses an image sensor to detect an object (foreign matter, defect, or the like) in an inspected body.

In Patent Literature 1, a spectral image of a plurality of wavelength bands is generated, and a feature quantity of the spectral image is compared to a feature quantity of normal data to detect foreign matter or the like (an object) mixed in an inspection object (inspected body). That is, in Patent Literature 1, the object is detected using a difference in physical properties between the inspected body and the object.

CITATION LIST

Patent Literature

PTL 1: Unexamined Japanese Patent Publication No. 2016-138789

SUMMARY

An inspection method according to an exemplary embodiment of the present disclosure is for detecting an object included in a body to be inspected by capturing an image of the object with an inspection apparatus. The inspection apparatus includes an image sensor. The image sensor includes a first imaging region and a reference imaging region. The first imaging region includes a plurality of first pixels which capture an image of the object in a first wavelength band and output a plurality of first feature quantities each of which corresponds to one of the plurality of first pixels. The reference imaging region includes a plurality of reference pixels which capture an image of the object in a reference wavelength band and output a plurality of reference feature quantities each of which corresponds to one of the plurality of reference pixels. The reference wavelength band overlaps with the first wavelength band. The inspection method includes: calculating a first reflectance of the object based on at least one of the plurality of first feature quantities and at least one of the plurality of reference feature quantities, the first reflectance being a reflectance in the first wavelength band; determining physical properties of the object based on the first reflectance; and correcting the image of the object generated according to output from the image sensor based on the at least one of the plurality of first feature quantities and the at least one of the plurality of reference feature quantities.

An inspection method according to another exemplary embodiment of the present disclosure is for detecting an object included in a body to be inspected by capturing an image of the object with an inspection apparatus. The inspection apparatus includes an image sensor. The image sensor includes a first imaging region, a second imaging region, and a reference imaging region. The first imaging region includes a plurality of first pixels which capture an image of the object in a first wavelength band and output a plurality of first feature quantities each of which corresponds to the plurality of first pixels. The second imaging region includes a plurality of second pixels which capture an image of the object in a second wavelength band and output a plurality of second feature quantities each of which corresponds to the plurality of second pixels. The reference imaging region includes a plurality of reference pixels which capture an image of the object in a reference wavelength band and output a plurality of reference feature quantities each of which corresponds to the plurality of reference pixels. The reference wavelength band overlaps with the first wavelength band and the second wavelength band. The inspection method includes: calculating a first reflectance and a second reflectance of the object based on at least one of the plurality of first feature quantities, at least one of the plurality of second feature quantities, and at least one of the reference feature quantities, the first reflectance being a reflectance in the first wavelength band and the second reflectance being a reflectance in the second wavelength band; determining physical properties of the object based on the first reflectance and the second reflectance; correcting the image of the object generated according to output from the image sensor based on the at least one of the plurality of first feature quantities, the at least one of the plurality of second feature quantities, and the at least one of the plurality of reference feature quantities; and determining a size of the object based on the image of the object corrected in the correcting the image.

An inspection apparatus according to an exemplary embodiment of the present disclosure is for detecting an object included in a body to be inspected. The inspection apparatus includes an image sensor and an image processing device. The image sensor includes a first imaging region and a reference imaging region. The first imaging region includes a plurality of first pixels which capture an image of the object in a first wavelength band and output a plurality of first feature quantities each of which corresponds to the plurality of first pixels. The reference imaging region includes a plurality of reference pixels which capture an image of the object in a reference wavelength band and output a plurality of reference feature quantities each of which corresponds to the plurality of reference pixels. The reference wavelength band overlaps with the first wavelength band. The image processing device obtains a first reflectance of the object based on at least one of the plurality of first feature quantities and at least one of the plurality of reference feature quantities, the first reflectance being a reflectance in the first wavelength band; determines physical properties of the object based on the first reflectance; corrects the image of the object generated according to output from the image sensor based on the at least one of the plurality of first feature quantities and the at least one of the plurality of reference feature quantities; and determines a size of the object based on the corrected image of the object.

BRIEF DESCRIPTION OF THE DRAWINGS

FIG. 15 is a plan view illustrating a configuration of an image sensor according to a second exemplary embodiment;

DETAILED DESCRIPTIONS

When using the technique in Patent Document 1, it is necessary to allocate pixels of the image sensor for each wavelength band in order to generate a spectral image of a plurality of wavelengths. Therefore, the resolution of the spectral image for each wavelength band is lower than the resolution of an image obtained from the resolving power of the image sensor. As a result, an image including an object becomes rough and, for example, the accuracy of size measurement of the object decreases.

Therefore, an objective of the present disclosure is to provide an inspection method and an inspection apparatus capable of determining physical properties of an object while suppressing a decrease in resolution of an image obtained from an image sensor.

Hereinafter, exemplary embodiments of the present disclosure will be described in detail with reference to the drawings. The following descriptions of preferable exemplary embodiments are substantially examples, and are not intended to limit the present disclosure, or applications or uses of the present disclosure.

Figure 1:
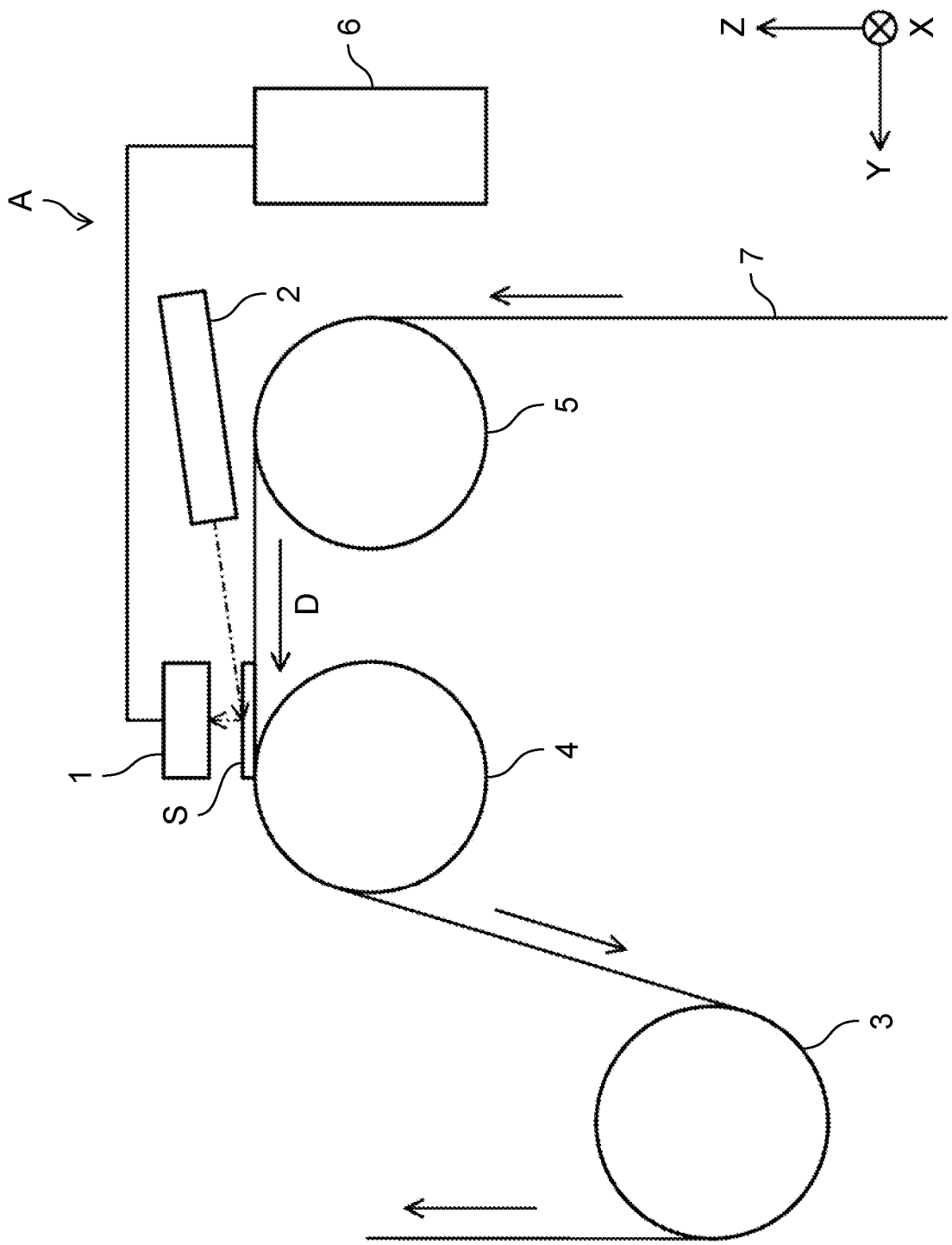
FIG. 1 is a side view of an inspection apparatus according to a first exemplary embodiment.
Figure 2:
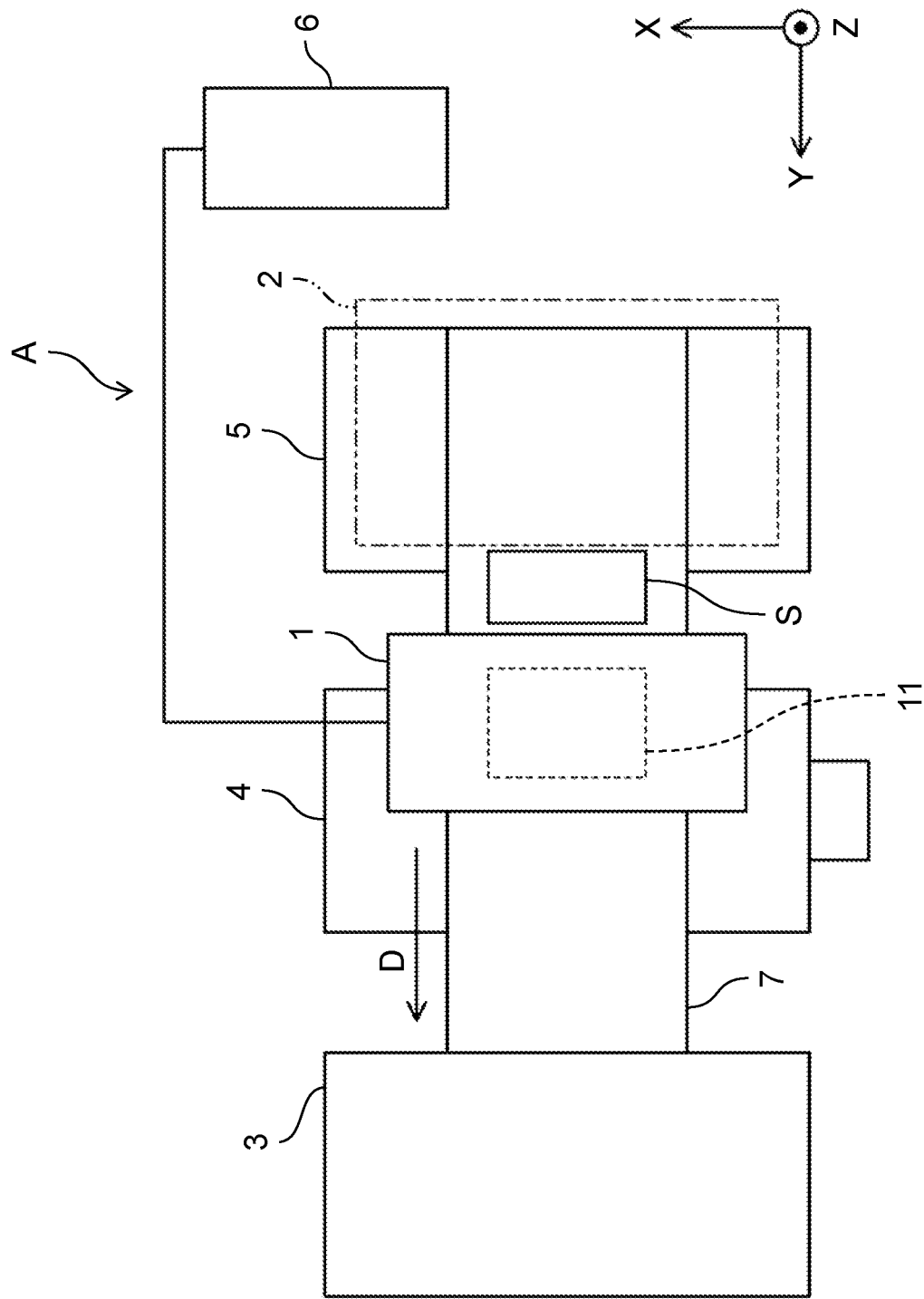
FIG. 2 is a plan view of the inspection apparatus according to the first exemplary embodiment.

FIG. 1 is a side view of an inspection apparatus, and FIG. 2 is a plan view of the inspection apparatus. As illustrated in FIGS. 1 and 2, inspection apparatus A includes imaging device 1, illumination device 2, rollers 3 to 5, and image processing device 6. Conveyor belt 7 is wound around the outer periphery of rollers 3 to 5.

Inspection apparatus A inspects sheet S (inspected body). Sheet S is used, for example, in a device field such as semiconductors, electronic devices, or secondary batteries. Note that in the following description, a case where the inspected body has a sheet shape will be described as an example, but the inspected body may not have a sheet shape. Furthermore, when sheet S is a long object, sheet S is wound around rollers 3 to 5 instead of conveyor belt 7. Then, sheet S is conveyed in the direction of arrow D by rollers 3 to 5.

Inspection apparatus A detects object E such as a defect or a foreign substance included in sheet S. The defect includes, for example, not only an incomplete portion or a deficient portion from the time of production of sheet S, such as a short circuit or a disconnection in inspected sheet S, but also damage (e.g., a scratch mark due to contact between sheet S and another member) to sheet S. When detected object E is larger than a predetermined size, the inspection apparatus determines that an object is included in sheet S. Note that sheet S is conveyed in the direction of arrow D indicated by a solid line in FIGS. 1 and 2 in a state of being placed on conveyor belt 7.

Imaging device 1 includes image sensor 11 and captures an image of sheet S being conveyed by conveyor belt 7. Here, imaging device 1 is configured as an area sensor that captures an image of entire sheet S between rollers 4, 5. Note that imaging device 1 may be configured not as an area sensor but as a line sensor.

Imaging device 1 transmits a pixel signal output from image sensor 11 to image processing device 6. Note that in the following description, a main scanning direction of imaging device 1 is an X direction, a sub-scanning direction of imaging device 1 is a Y direction, and a direction perpendicular to the X direction and the Y direction is a Z direction.

Illumination device 2 includes, for example, a light source including elements such as a light-emitting diode (LED), a laser, and a halogen light source, and irradiates a scanning region (sheet S) of imaging device 1 with light between rollers 4, 5. Specifically, illumination device 2 is mounted such that the light irradiation direction has an incident angle of about 10° with respect to conveyor belt 7. Furthermore, imaging device 1 and illumination device 2 are configured as a dark field optical system so that light emitted from illumination device 2 does not directly enter image sensor 11. Imaging device 1 and illumination device 2 may be configured as a bright field optical system, but are preferably configured as a dark field optical system. Through the configuration of the dark field optical system, illumination can be applied to object E at a low angle, so that the base of object E does not shine (the brightness of the base (ground level) where there is no foreign substance has a low gradation). As a result, the luminance of object E becomes higher than the luminance of the base, and the signal noise (SN (luminance of foreign substance/luminance of base)) ratio increases, so that a clear image of object E can be generated.

Roller 3 is rotated by an unillustrated driving mechanism to drive conveyor belt 7, thereby conveying sheet S in a direction indicated by a solid arrow in the drawing.

Image processing device 6 is a computer, for example. Image processing device 6 determines the physical properties and the size of object E based on the pixel signal received from imaging device 1 (image sensor 11). Specifically, image processing device 6 performs image extraction processing, physical property determination processing, image correction processing, and size determination processing to be described later.

The configuration of inspection apparatus A is not limited to the above-described configuration.

Inspection apparatus A may include a rotary encoder that detects the rotation speeds of rollers 3 to 5. In this case, the movement amount of sheet S conveyed by conveyor belt 7 may be detected based on the detection result of the rotary encoder.

An image of sheet S may be captured while sheet S or imaging device 1 is moving, or may be captured when sheet S or imaging device 1 is stationary.

First Exemplary Embodiment (Configuration of Image Sensor)

Figure 3:
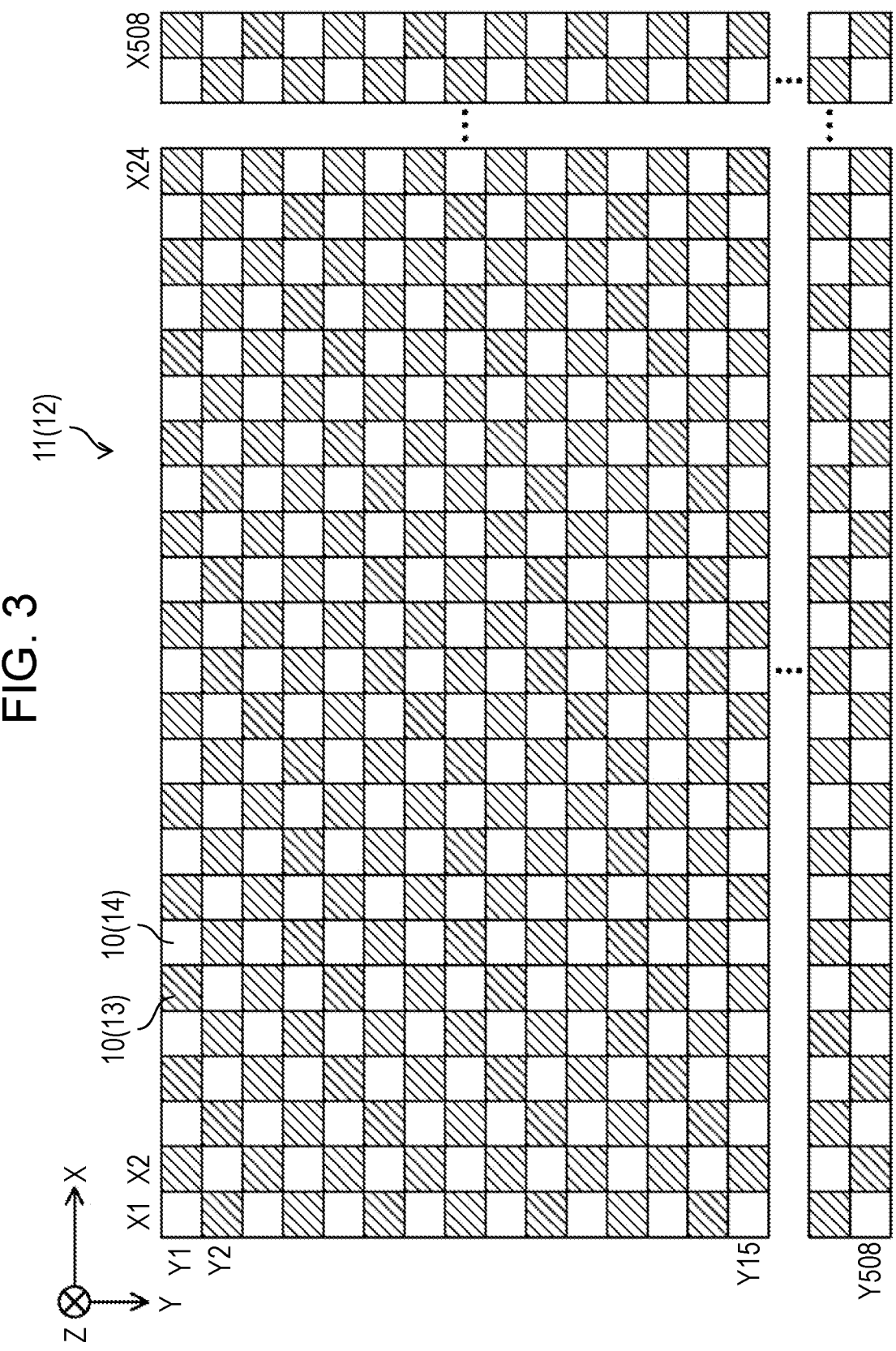
FIG. 3 is a plan view illustrating a configuration of an image sensor according to the first exemplary embodiment.

FIG. 3 is a plan view illustrating a configuration of an image sensor according to a first exemplary embodiment. Examples of image sensor 11 include a complementary metal-oxide semiconductor (CMOS) image sensor.

As illustrated in FIG. 3, image sensor 11 includes pixel array 12 in which m pixels 10 in the X direction and n pixels 10 in the Y direction (508×508 in FIG. 3) are arranged in a lattice pattern. Note that in the following description, ith pixel 10 in the X direction and jth pixel 10 in the Y direction may be referred to as a pixel (Xi, Yj).

Pixel array 12 includes pixels 10 allocated to first imaging region 13 and pixels 10 allocated to reference imaging region 14. In FIG. 3, regarding a pixel (Xi, Yj), pixels 10 for which i is an odd number and j is an even number and pixels 10 for which i is an even number and j is an odd number are allocated to first imaging region 13. Furthermore, regarding a pixel (Xi, Yj), pixels 10 for which i and j are odd numbers and pixels 10 for which i and j are even numbers are allocated to reference imaging region 14. That is, in FIG. 3, pixels 10 allocated to first imaging region 13 are arranged mutually adjacent to pixels 10 allocated to reference imaging region 14.

An optical interference filter that transmits light in a first wavelength band is mounted on pixels 10 of first imaging region 13. That is, first imaging region 13 is a region in which pixels 10 are arranged that capture a spectral image in the first wavelength band. In the present exemplary embodiment, the first wavelength band is assumed to be a red wavelength band (625 nm to 780 nm).

Reference imaging region 14 is a region in which pixels 10 are arranged that capture an image in a reference wavelength band which includes the first wavelength band. In the present exemplary embodiment, the reference wavelength band is assumed to be 400 nm to 800 nm. In addition, the reference wavelength band does not necessarily include the entire first wavelength band, and may include a part of the first wavelength band. For example, when the first wavelength band is 625 nm to 780 nm, the reference wavelength band may be 400 nm to 700 nm. That is, the reference wavelength band need only overlap with the first wavelength band.

(Operation of Image Processing Device)

Figure 4:
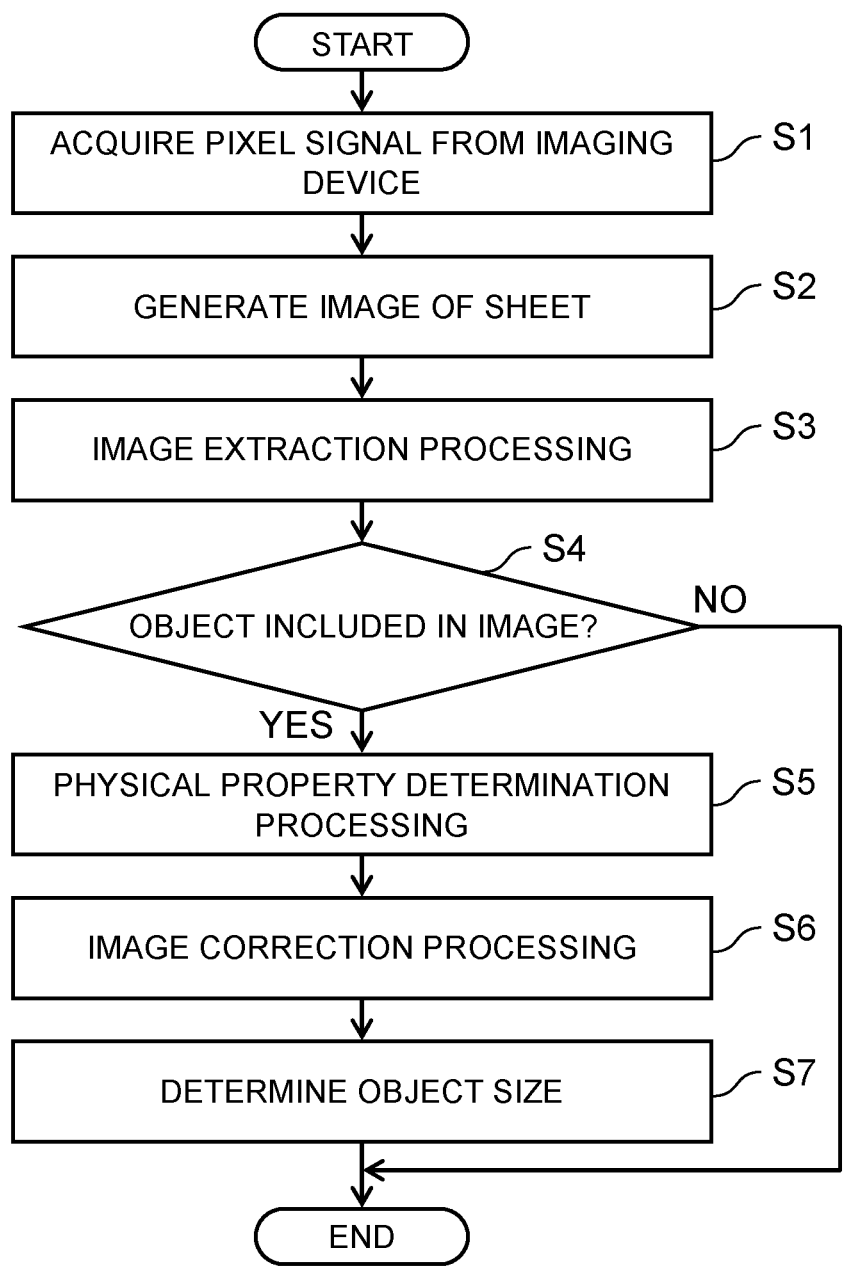
FIG. 4 is a flowchart depicting an overall operation flow of an image processing device according to the first exemplary embodiment.

An inspection method for an inspected body according to the first exemplary embodiment will be described with reference to FIGS. 4 to 14C. FIG. 4 is a flowchart depicting an overall operation flow of image processing device according to the first exemplary embodiment.

Imaging device 1 (image sensor 11) captures an image of sheet S conveyed by conveyor belt 7 between rollers 4, 5. Image processing device 6 acquires (receives) the pixel signal output from imaging device 1 (step S1).

Based on the pixel signal acquired from imaging device 1, image processing device 6 generates image P of sheet S (step S2). Then, image processing device 6 performs image extraction processing to be described later and generates extracted image p (step S3).

Image processing device 6 determines whether or not extracted image p of object E is included in image P (step S4). When image processing device 6 has determined that extracted image p of object E is not included in image P (No in step S4), the processing ends. That is, image processing device 6 determines that object E is not included in sheet S.

When determining that extracted image p of object E is included in image P (Yes in step S4), image processing device 6 performs physical property determination processing to be described later (step S5) to determine the physical properties of object E.

After step S5, image processing device 6 performs image correction processing to be described later (step S6) and generates corrected image pw in which extracted image p has been corrected. Image processing device 6 uses generated corrected image pw to determine the size of object E (step S7).

(Image Extraction Processing)

Figure 5:
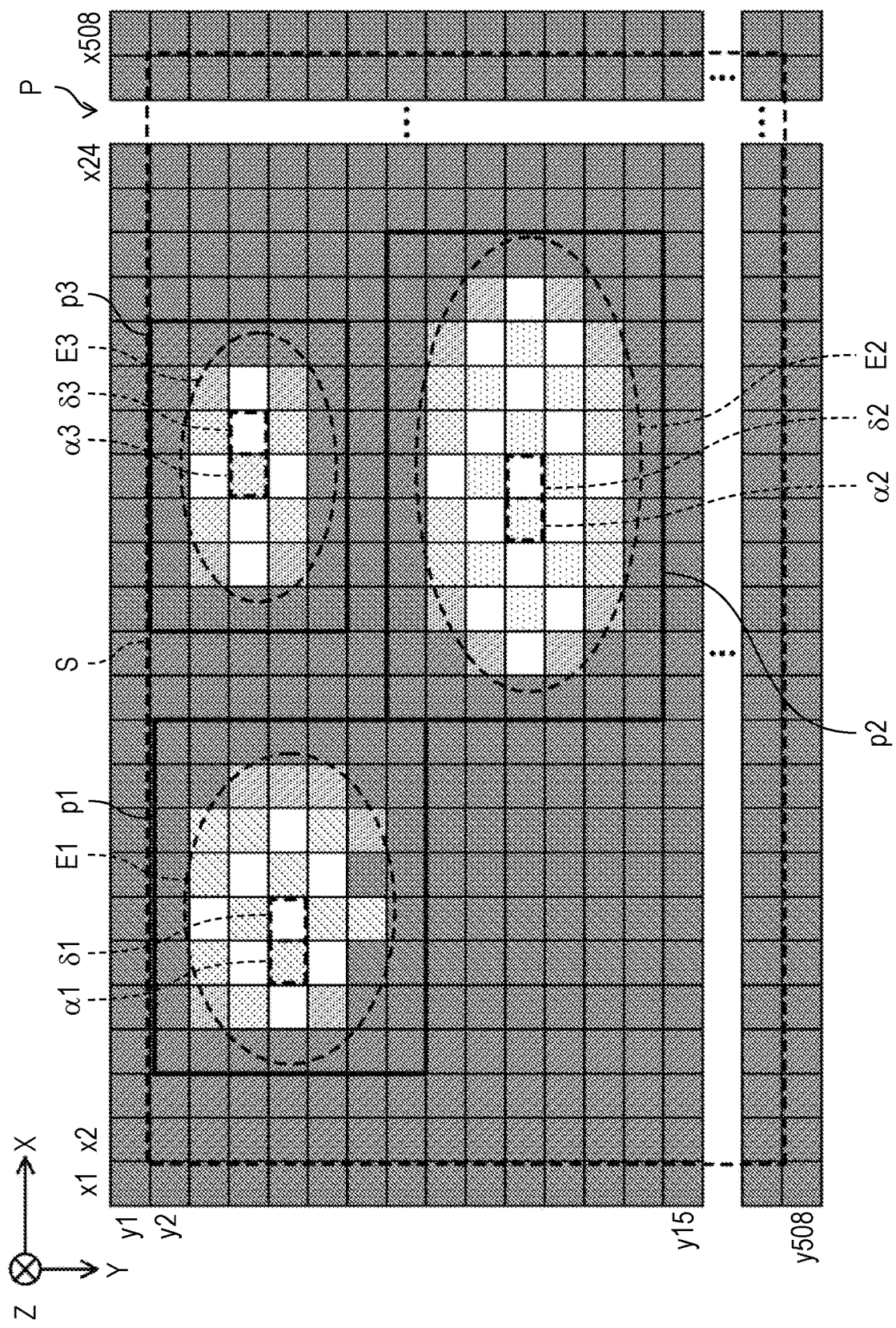
FIG. 5 is a diagram illustrating an example image of a sheet captured by the image sensor according to the first exemplary embodiment.
Figure 6:
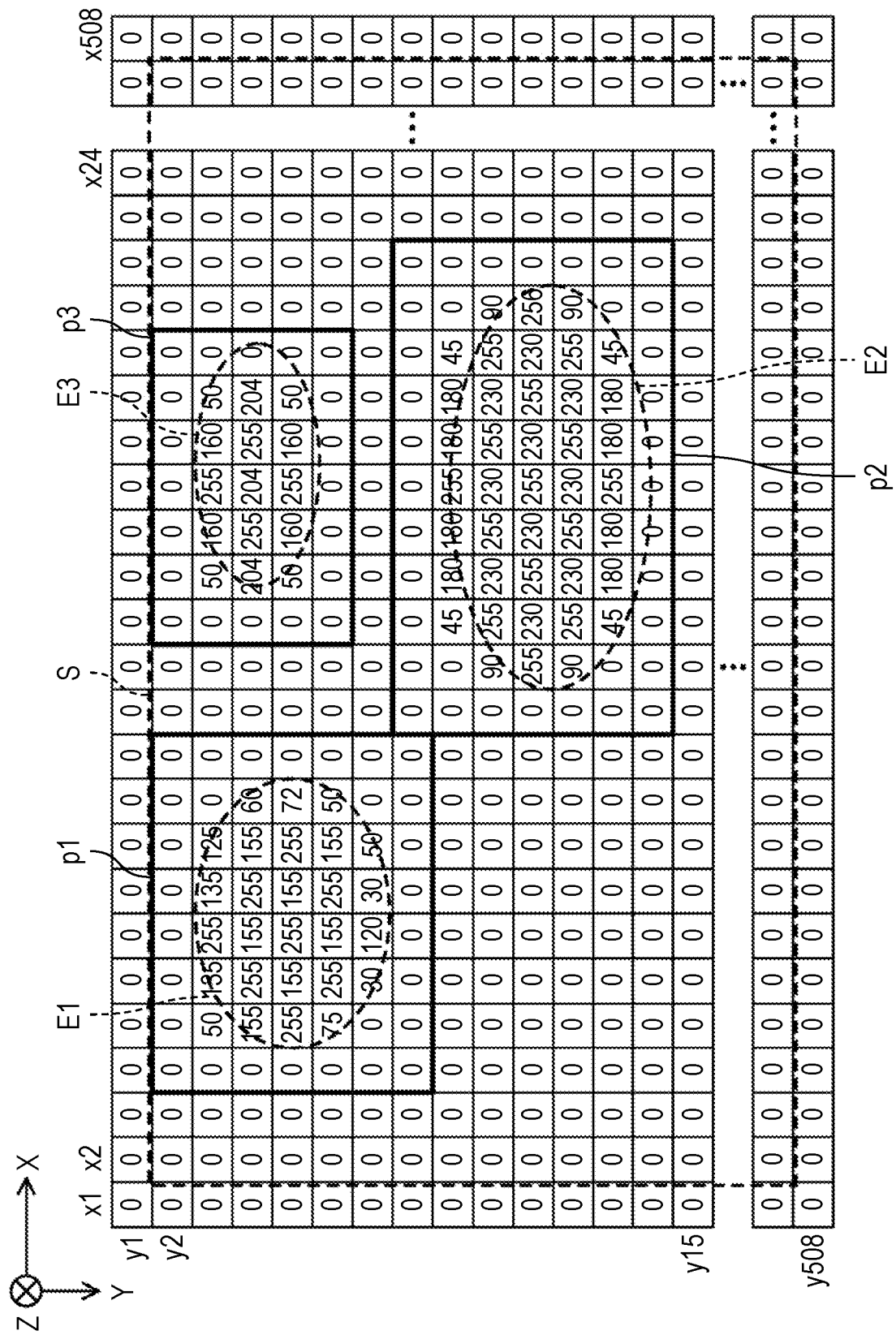
FIG. 6 is a diagram illustrating an example of luminance values of the sheet captured by the image sensor according to the first exemplary embodiment.

Next, image extraction processing of image processing device 6 is described with reference to FIGS. 5 and 6. FIG. 5 is a diagram illustrating an example image of a sheet captured by the image sensor according to the first exemplary embodiment. FIG. 6 is a diagram illustrating an example of luminance values of the sheet captured by the image sensor according to the first exemplary embodiment.

In step S2, image processing device 6 generates image P of sheet S illustrated in FIG. 5 based on the pixel signal acquired from image sensor 11. Note that in FIG. 5, it is assumed that an image of sheet S is captured so as to fit in a dashed line portion. Furthermore, as described in the following, image data corresponding to a pixel (Xi, Yj) is assumed to be an image (xi, yj).

Then, in step S3, image processing device 6 performs image extraction processing. Specifically, image processing device 6 extracts extracted image p of object E based on a feature quantity of each image (xi, yj) in image P. Examples of the feature quantities include luminance values and brightnesses for each image (xi, yj) in image P. Further, the feature quantities may be determined based on a feature quantity of sheet S not including object E. In addition, the presence or absence of object E is determined using a feature quantity such as a surface area value, a size in the X direction, a size in the Y direction, a shape, and a concentration sum of object E. In the present exemplary embodiment, a case where the feature quantities are luminance values of each image (xi, yj) in image P will be described as an example.

FIG. 6 illustrates luminance values for each image (xi, yj) in image P. In FIG. 6, the luminance values are displayed in 256 gradations of 8 bits, and the minimum value of the luminance values is 0 and the maximum value is 255. In FIG. 6, when object E is not present on sheet S (ground level), luminance values are 0.

First, image processing device 6 extracts an image (xi, yj) having a luminance value equal to or greater than a threshold value. Then, image processing device 6 sets a plurality of adjacent images (xi, yj) in the extracted image as one object E. The term "adjacent images" as used herein refers to images that are in contact with one image in the X direction (horizontal direction), in the Y direction (vertical direction), or in the X direction and the Y direction (oblique direction). Specifically, in the case of an image (xi, yj), images (xi, yj±1), (xi±1, yj), and (xi±1, yj±1) are adjacent images. Image processing device 6 generates extracted image p so as to include extracted object E.

For example, in FIG. 6, when the threshold value of the luminance values is set to 20, image processing device 6 extracts regions of images (xi, yj) surrounded by a broken line as objects E1 to E3. Then, image processing device 6 generates extracted images p1 to p3 so as to include respective objects E1 to E3 (refer to FIGS. 5 and 6). Specifically, images included in the region of the images (x4, y2) to (x11, y8) are extracted as extracted image p1. Images included in the region of the images (x14, y2) to (x20, y6) are extracted as extracted image p2. Images included in the region of the images (x12, y8) to (x22, y14) are extracted as extracted image p3.

When generating extracted image p from image P in step S4, image processing device 6 determines that extracted image p of object E is included in image P.

(Physical Property Determination Processing)

Figure 7:
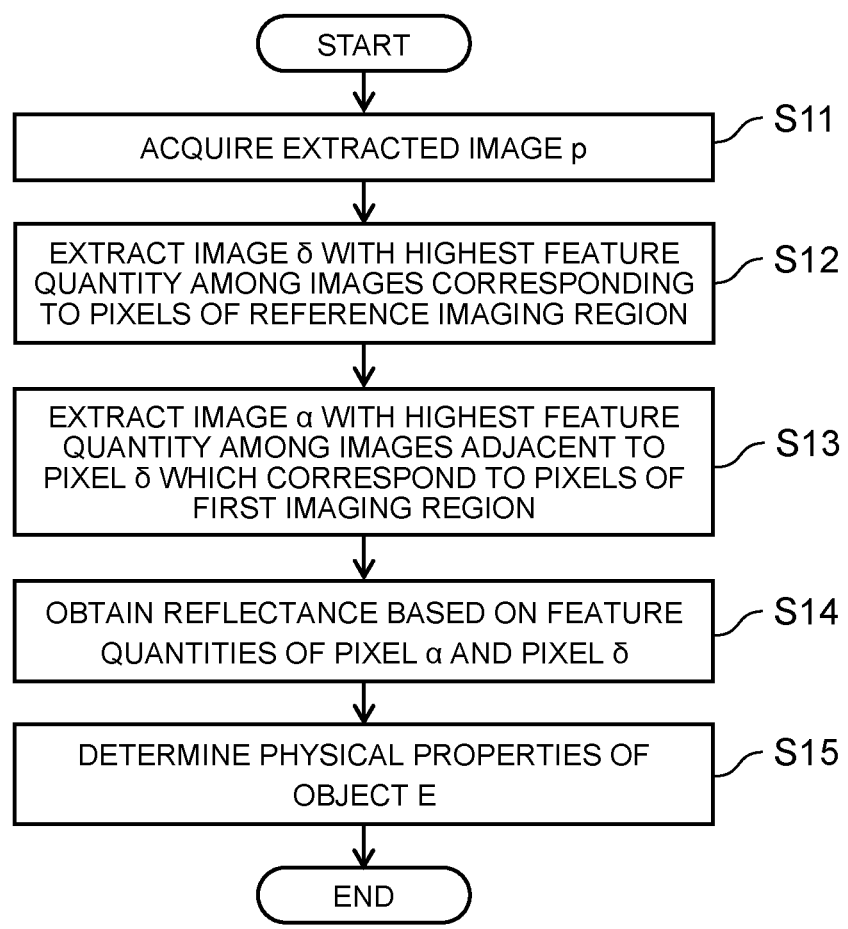
FIG. 7 is a flowchart depicting a flow of physical property determination processing of the image processing device according to the first exemplary embodiment.

Next, physical property determination processing (step S5) of image processing device 6 is described with reference to FIGS. 5 to 8. FIG. 7 is a flowchart depicting a flow of physical property determination processing of the image processing device according to the first exemplary embodiment.

When acquiring extracted image p (extracted images p1 to p3 in FIGS. 5 and 6) (step S11), image processing device 6 extracts image δ with the highest feature quantity among images included in extracted image p which correspond to pixels 10 of reference imaging region 14 (step S12). Then, image processing device 6 extracts an image α with the highest feature quantity among the images adjacent to the extracted image δ which correspond to pixels 10 of first imaging region 13 (step S13). The term "adjacent images" as used herein refers to images that are in contact with one image in the X direction (horizontal direction), in the Y direction (vertical direction), or in the X direction and the Y direction (oblique direction).

Referring to FIG. 5, in extracted images p1 to p3, images δ1 to δ3 (luminance values 255, 255, and 255) correspond to respective images δ, and images α1 to α3 (luminance values 155, 230, and 204) correspond to respective images α.

After step S13, a reflectance R of object E in the first wavelength band is obtained based on the feature quantities (luminance values) of image δ and the image α (step S14). Specifically, the reflectance R can be obtained by (luminance value of image α)/(luminance value of image δ). Pixel 10 of first imaging region 13 corresponding to the image α captures a spectral image in the first wavelength band, and pixel 10 of reference imaging region 14 corresponding to image δ captures a spectral image in the reference wavelength band including the first wavelength band. Therefore, the reflectance R of object E in the first wavelength band can be obtained by comparing the luminance values (feature quantities) of the image α and image δ.

Figure 9:
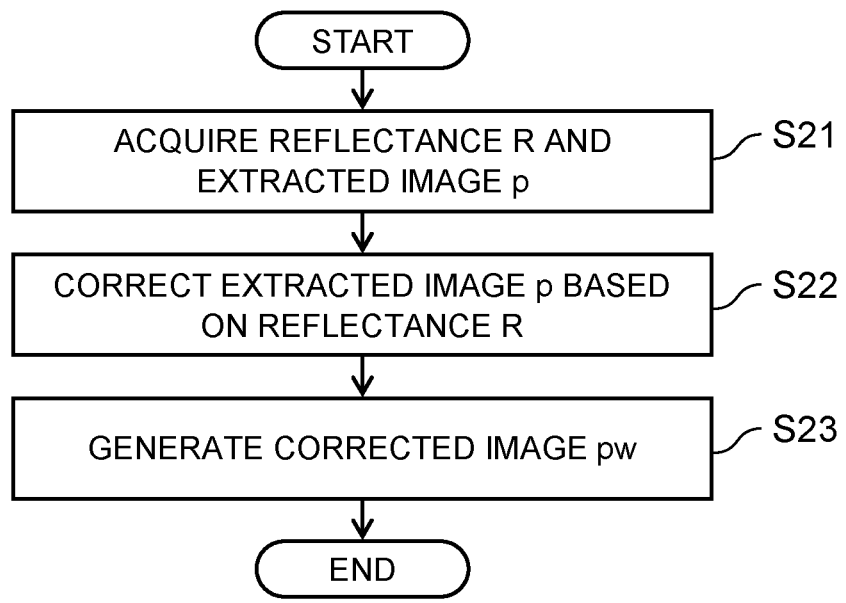
FIG. 9 is a flowchart depicting a flow of image correction processing of the image processing device according to the first exemplary embodiment.

For example, in FIG. 9, a reflectance R1 of object E1=155/255≈0.60, making the reflectance R1 of object E1 60%. A reflectance R2 of object E2=235/255≈0.90, making the reflectance R2 of object E2 90%. A reflectance R3 of object E3=204/255=0.80, making the reflectance R3 of object E3 80%.

After step S14, image processing device 6 determines the physical properties of object E based on the calculated reflectance R (step S15). Specifically, image processing device 6 determines the physical properties of object E based on a preset threshold value. This threshold value is set based on spectral reflectance curves (spectral reflectance data, refer to FIG. 8) indicating spectral reflectances of a plurality of substances. Image processing device 6 determines the physical properties of object E by comparing the reflectance R to the threshold value.

Figure 8:
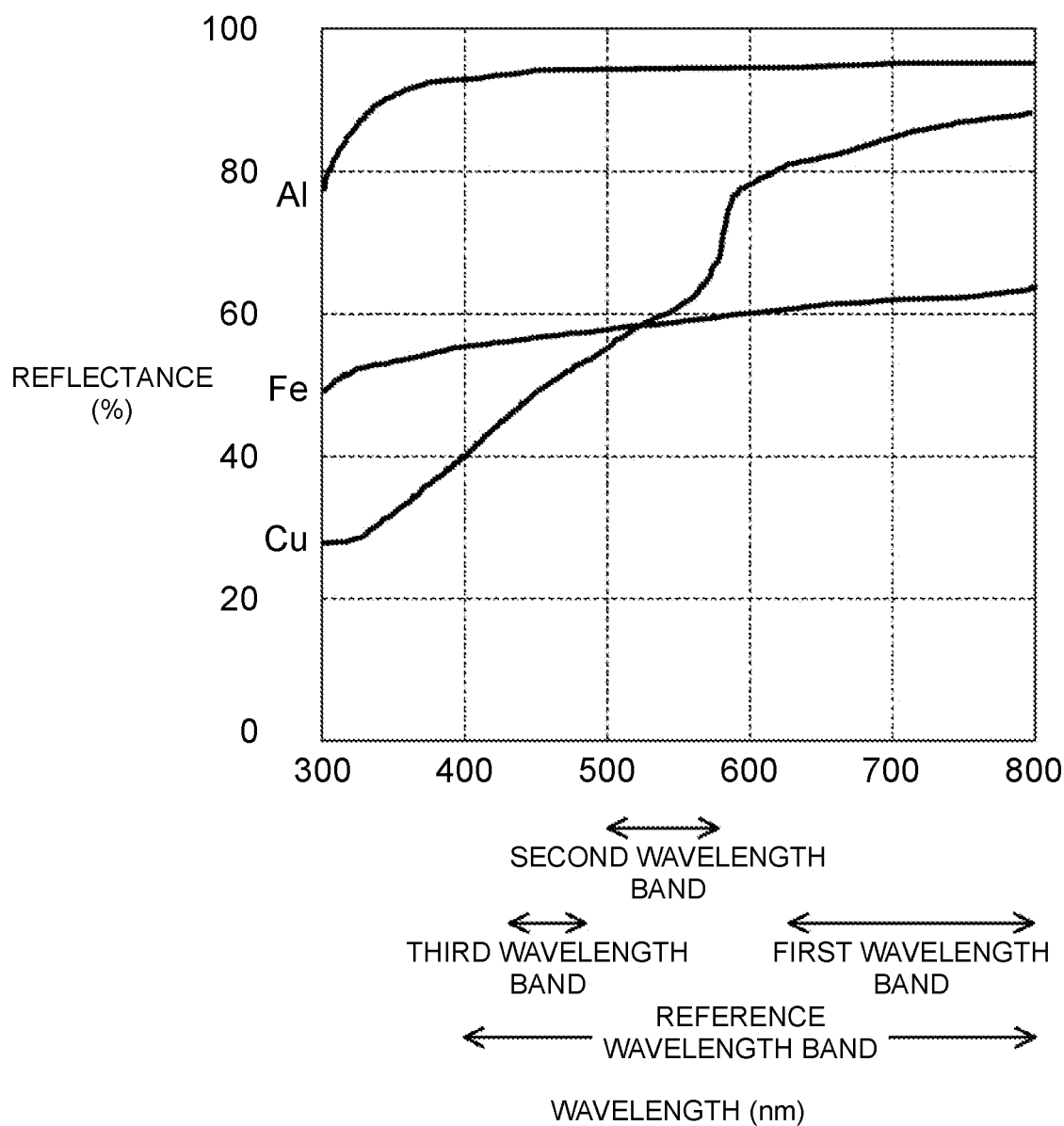
FIG. 8 is a graph showing spectral reflectance curves indicating spectral reflectances of a plurality of substances.

FIG. 8 illustrates spectral reflectance curves of Al, Fe, and Cu in each wavelength band. Since the first wavelength band is 625 nm to 780 nm, it can be determined that object E is Fe when the reflectance is 50% to 70%, Cu when the reflectance is 70% to 90%, and Al when the reflectance is 90% or more. Specifically, since the reflectance R1 of object E1 is 60%, object E1 is determined to be Fe. Since the reflectance R2 of object E2 is 90%, object E2 is determined to be Al. Since the reflectance R3 of object E3 is 80%, object E3 is determined to be Fe. In this manner, the physical properties of object E can be determined by setting the threshold value for determining the physical properties of object E based on the spectral reflectance curves.

The method of calculating the reflectance R is not limited to the above-described method. For example, the reflectance R can also be obtained by the following method.

First, an image of object E is extracted from extracted image p. At this time, an image excluding single pixels surrounding object E is extracted. As a result, object E present in the entire region of extracted image p can be extracted.

Next, an average luminance value α' is obtained by averaging luminance values of images corresponding to pixels 10 of first imaging region 13 among the extracted image of object E. Furthermore, an average luminance value δ' is obtained by averaging luminance values of images corresponding to pixels 10 of reference imaging region 14 among the extracted image of object E. Then, the reflectance R of object E in the first wavelength band is obtained based on the average luminance value α' and the average luminance value δ'. Specifically, the reflectance R is obtained by (average luminance value α')/(average luminance value δ'). As described above, by performing averaging processing on luminance values used in obtaining the reflectance, it is possible to reduce error in the reflectance caused by the influence of a singular point.

Substances other than metals can also be detected as object E. For example, it is also possible to measure a resin. The reflectance of a resin is low in the visible light region and high in the infrared region. Therefore, when detecting a resin, it is necessary to widen the first wavelength band and the reference wavelength band to 1000 nm for measurement.

(Image Correction Processing)

Next, image correction processing (step S6) of image processing device 6 will be described with reference to FIGS. 9 to 13. FIG. 9 is a flowchart depicting a flow of image correction processing of the image processing device according to the first exemplary embodiment.

When acquiring extracted image p (p1 to p3) and a reflectance R (R1 to R3) (step S21), image processing device 6 corrects the image of extracted image p (step S22). Then, image processing device 6 generates corrected image pw in which extracted image p has been corrected (step S23).

Figure 10A:
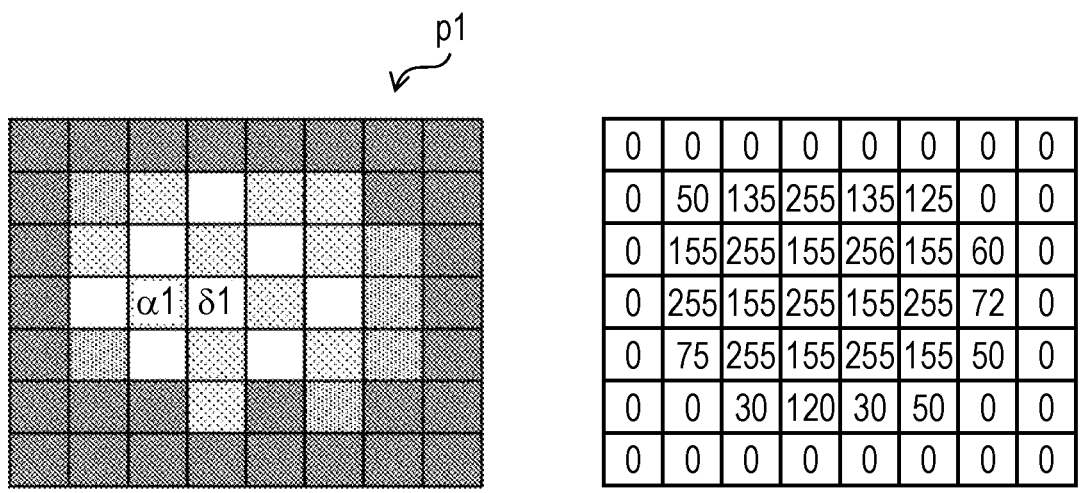
FIG. 10A is a diagram illustrating an extracted image before correction.
Figure 10B:
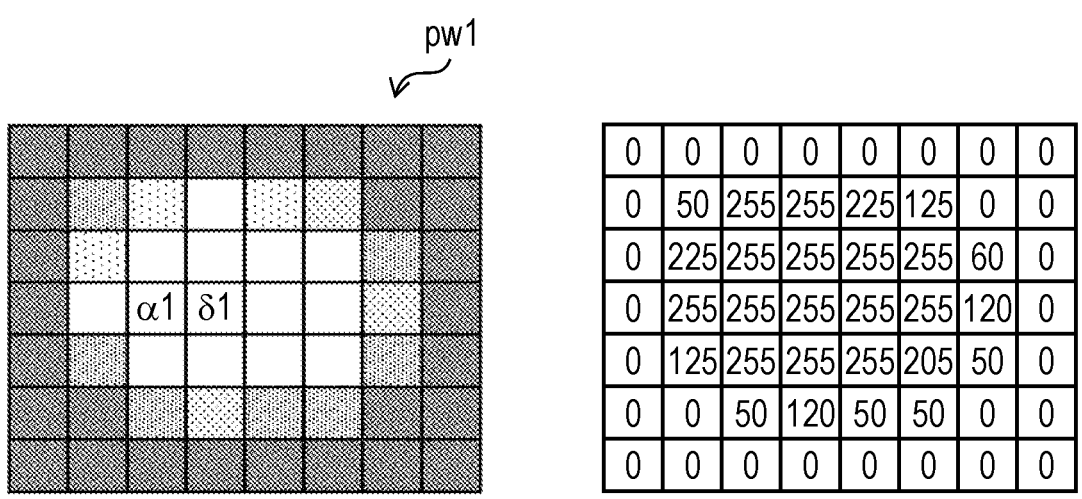
FIG. 10B is a diagram illustrating a corrected image after correction.
Figure 11A:
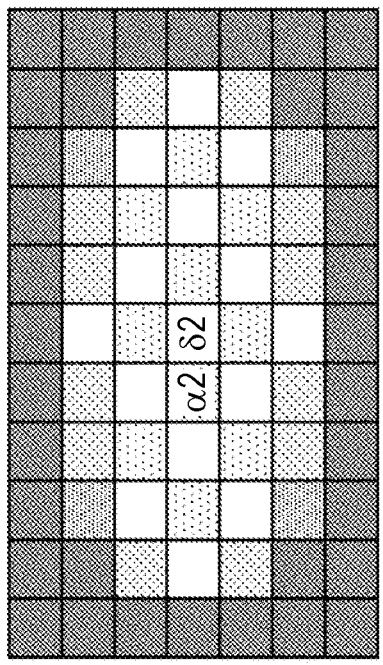
FIG. 11A is a diagram illustrating an extracted image before correction.
Figure 11B:
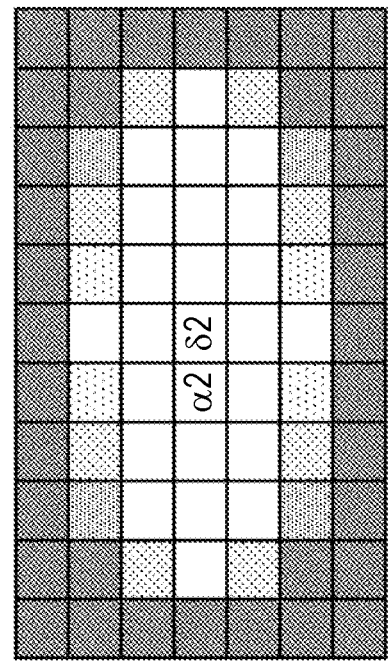
FIG. 11B is a diagram illustrating a corrected image after correction.
Figure 12A:
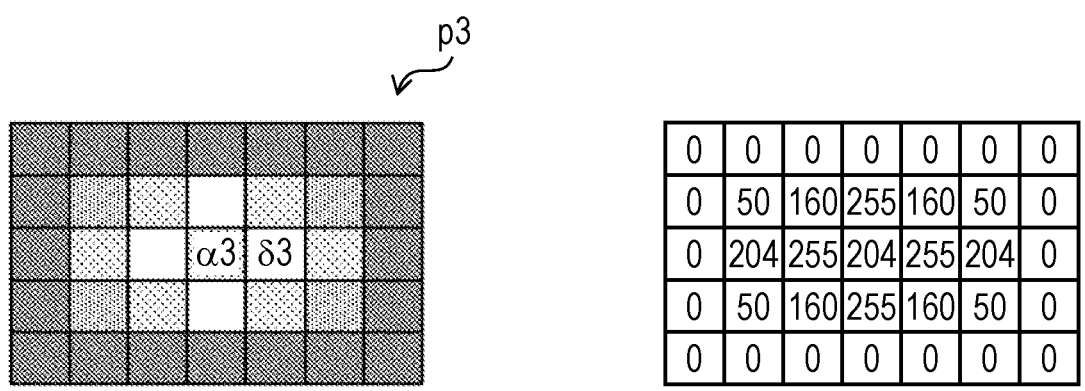
FIG. 12A is a diagram illustrating an extracted image before correction.
Figure 12B:
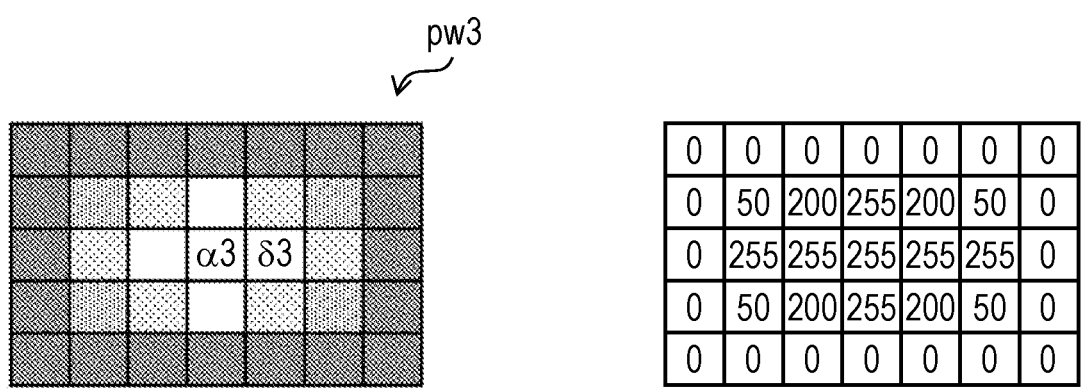
FIG. 12B is a diagram illustrating a corrected image after correction.

FIG. 10A illustrates extracted image p1 before correction and luminance values thereof. FIG. 10B illustrates corrected image pw1 after correction and luminance values thereof. FIG. 11A illustrates extracted image p2 before correction and luminance values thereof. FIG. 11B illustrates corrected image pw2 after correction and luminance values thereof. FIG. 12A illustrates extracted image p3 before correction and luminance values thereof. FIG. 12B illustrates corrected image pw3 after correction and luminance values thereof.

As illustrated in FIGS. 10A, 11A, and 12A, the images corresponding to pixels 10 in first imaging region 13 have luminance values lower than those of the images corresponding to pixels 10 in reference imaging region 14. This is because pixels 10 of first imaging region 13 generate a spectral image in the first wavelength band which is narrower than the reference wavelength band. Therefore, by correcting the luminance values of the images corresponding to pixels 10 of first imaging region 13 to be about the same as the luminance values of the images corresponding to pixels 10 of reference imaging region 14, a clear image of object E can be acquired.

Figure 13:
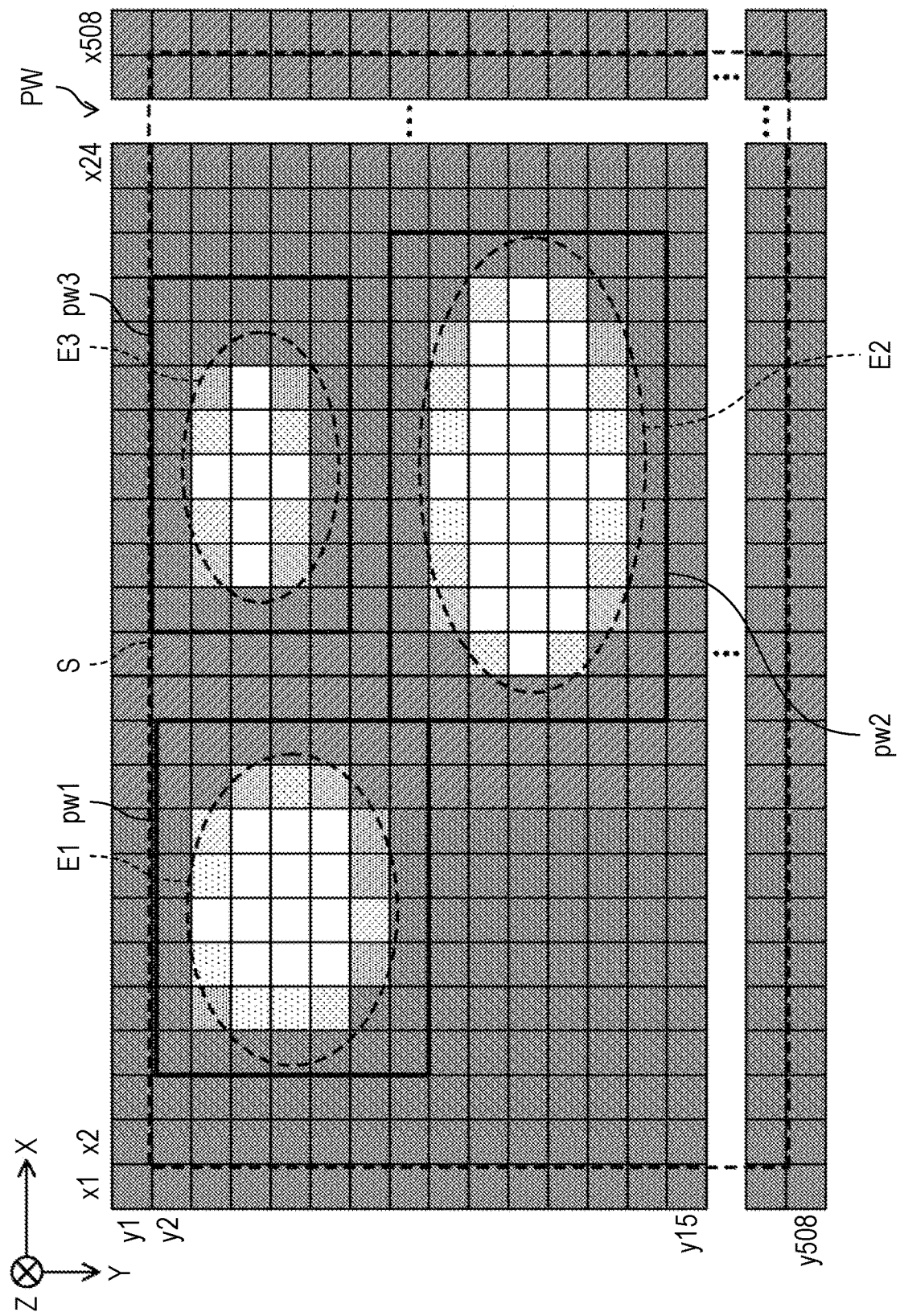
FIG. 13 is a diagram illustrating an example of a corrected image of the sheet according to the first exemplary embodiment.

For example, the above correction can be performed by dividing the reflectance R by the luminance value of each image corresponding to pixels 10 of first imaging region 13. By performing such correction on extracted images p1 to p3 from before correction, corrected images pw (pw1 to pw3) as illustrated in FIGS. 10B, 11B, and 12B can be generated. By replacing corrected image pw in the position of extracted image p of image P as illustrated in FIG. 13, clear image PW of object E is acquired.

The correction processing in step S22 is not limited to the above-described method. For example, the luminance values of the images corresponding to pixels 10 of first imaging region 13 may be set as an average value of luminance values equal to or greater than a threshold value among adjacent images which correspond to pixels 10 of reference imaging region 14.

For example, in FIGS. 5 and 10A, when an image (X6, Y3) is corrected, the average value of the luminance values of adjacent images (X6, Y2), (X5, Y3), (X7, Y3), and (X6, Y4) becomes the luminance value of the image (X6, Y3). Since the luminance value of the image (X6, Y2) is 0, it is excluded from averaging. Here, the luminance value of the image (X6, Y3)=(50+255+255)/3≈187. In this manner, the luminance values of the images corresponding to pixels 10 in first imaging region 13 may be corrected based on the luminance values of the images corresponding to pixels 10 in reference imaging region 14.

(Object Size Determination)

Figure 14A:
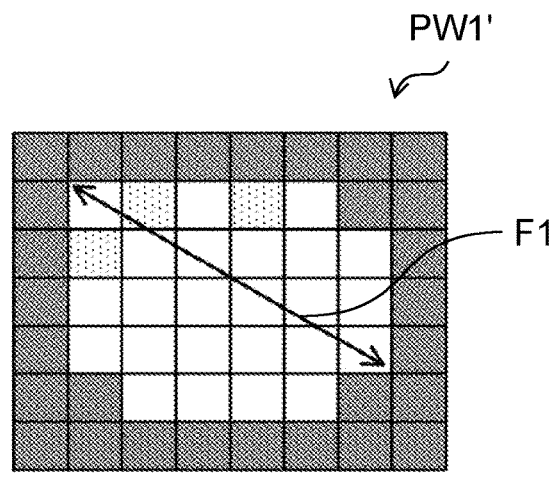
FIG. 14A is a diagram for describing an object size determination method according to the first exemplary embodiment.
Figure 14B:
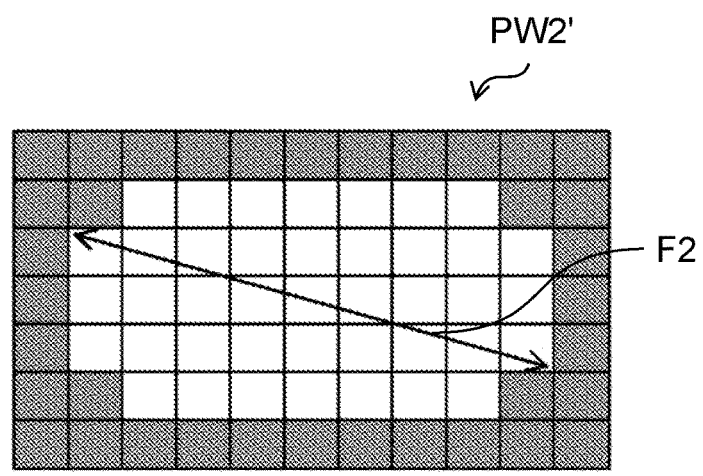
FIG. 14B is a diagram for describing the object size determination method according to the first exemplary embodiment.
Figure 14C:
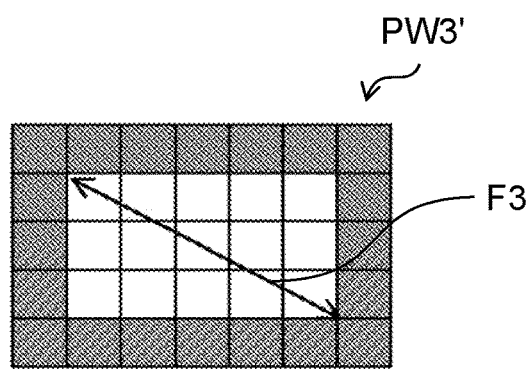
FIG. 14C is a diagram for describing the object size determination method according to the first exemplary embodiment.

Next, size determination processing (step S7) of image processing device 6 will be described with reference to FIGS. 14A to 14C. FIGS. 14A to 14C are diagrams for describing an object size determination method according to the first exemplary embodiment. Specifically, FIGS. 14A to 14C illustrate respective corrected images pw1' to pw3' obtained by performing binarization processing on corrected images pw1 to pw3 in FIGS. 10B, 11B, and 12B with luminance value 30 as a threshold value.

Aspects such as the area, the maximum length, the aspect ratio, the vertical width, the horizontal width, the Feret diameter (maximum value, minimum value, etc.), and the length of the main axis (maximum value, minimum value, etc.) are used as the size of object E. In the present exemplary embodiment, a case where the maximum Feret diameter F is obtained as the size of object E will be described as an example. Since the Feret diameter refers to the longitudinal and lateral lengths of a rectangle circumscribing a certain object, the maximum Feret diameter indicates the maximum length of the rectangle circumscribing the object.

In FIGS. 14A to 14C, the length indicated by the arrow is the maximum Feret diameter of objects E1 to E3. Accordingly, the sizes of objects E1 to E3 can be determined.

As described above, inspection apparatus A includes an image sensor 11. Image sensor 11 includes first imaging region 13 and reference imaging region 14. First imaging region 13 includes a plurality of first pixels 10 which capture an image of object E in a first wavelength band and output a plurality of luminance values (first feature quantities). Reference imaging region 14 includes a plurality of reference pixels 10 which capture an image of object E in a reference wavelength band that overlaps with the first wavelength band and output a plurality of luminance values (reference feature quantities). Image processing device 6 obtains a reflectance R (first reflectance) of object E in the first wavelength band based on at least one of the plurality of luminance values (first feature quantities) and at least one of the plurality of luminance values (reference feature quantities), and determines the physical properties of object E based on the reflectance R. Image processing device 6 corrects the image of object E generated according to the output from image sensor 11 based on the reflectance R. That is, since the reflectance R in the first wavelength band of object E is obtained based on the luminance values output from pixels 10 in first imaging region 13 and the luminance values output from pixels 10 in reference imaging region 14, the physical properties of object E can be determined. Furthermore, since the image output from image sensor 11 is corrected by the obtained reflectance R, it is possible to suppress a decrease in resolution of the image obtained from the image sensor. Therefore, it is possible to determine the physical properties of the object while suppressing a decrease in resolution of the image obtained from the image sensor.

Furthermore, the reflectance R is calculated based on the maximum luminance value among the luminance values output from pixels 10 in first imaging region 13 and the maximum luminance value among the luminance values output from pixels 10 in reference imaging region 14. As a result, the reflectance R can be accurately calculated.

In addition, image processing device 6 determines the physical properties of object E based on the reflectance R and spectral reflectance curves (spectral reflectance data) indicating the spectral reflectances of a plurality of substances. Accordingly, the physical properties of object E can be accurately determined.

Furthermore, image processing device 6 determines the physical properties of object E by comparing the reflectance R with a threshold value set based on a spectral reflectance curve. As a result, even if a deviation occurs between the obtained reflectance R and the corresponding substance in the spectral reflectance curve, the physical properties of object E can be determined.

In addition, image processing device 6 corrects the image of object E by dividing the reflectance R by the luminance value of each image corresponding to pixels 10 in first imaging region 13. As a result, the luminance values of the image corresponding to pixels 10 in first imaging region 13 are corrected to be about the same as the luminance values of the image corresponding to pixels 10 of reference imaging region 14, and thus a clear image of object E can be acquired.

Second Exemplary Embodiment (Configuration of Image Sensor)

FIG. 15 is a plan view illustrating a configuration of an image sensor according to a second exemplary embodiment.

Image sensor 11 in FIG. 15 includes pixel array 15 in which m pixels 10 in the X direction and n pixels 10 in the Y direction (508×508 in FIG. 18) are arranged in a lattice pattern.

Pixel array 15 includes pixels 10 allocated to first imaging region 13, pixels 10 allocated to second imaging region 16, pixels 10 allocated to third imaging region 17, and pixels 10 allocated to reference imaging region 14. In FIG. 15, regarding a pixel (Xi, Yj), pixels 10 for which i and j are odd numbers are allocated to first imaging region 13. Also regarding a pixel (Xi, Yj), pixels 10 for which i is an odd number and j is an even number are allocated to second imaging region 16. Regarding a pixel (Xi, Yj), pixels 10 for which i is an even number and j is an odd number are allocated to third imaging region 17. Regarding a pixel (Xi, Yj), pixels 10 for which i and j are even numbers are allocated to reference imaging region 14.

Optical interference filters that transmit light of a first wavelength band, a second wavelength band, and a third wavelength band are mounted on pixels 10 of respective first imaging region 13, second imaging region 16, and third imaging region 17. That is, first imaging region 13, second imaging region 16, and third imaging region 17 are regions in which pixels 10 that capture a spectral image in the first wavelength band, the second wavelength band, and the third wavelength band are respectively arranged. In the present exemplary embodiment, the first wavelength band is assumed to be a red wavelength band (625 nm to 780 nm), the second wavelength band is assumed to be a green wavelength band (500 nm to 565 nm), and the third wavelength band is assumed to be a blue wavelength band (450 nm to 485 nm).

Reference imaging region 14 is a region in which pixels 10 that capture an image in a reference wavelength band including the first wavelength band, the second wavelength band, and the third wavelength band are arranged. In the present exemplary embodiment, the reference wavelength band is assumed to be 400 nm to 800 nm. In addition, the reference wavelength band does not necessarily include the entire first wavelength band, second wavelength band, and third wavelength band, and may include a part of each wavelength band. That is, the reference wavelength band need only overlap with the first wavelength band, the second wavelength band, and the third wavelength band.

(Operation of Image Processing Device)

An inspection method for an inspected body according to the second exemplary embodiment will be described with reference to FIGS. 16 to 19. The inspection method according to the second exemplary embodiment differs in the physical property determination processing (step S5) and image correction processing (step S6) of FIG. 3. This processing is described below. Note that in the image extraction processing, it is assumed that an image included in the region of images (x4, y2) to (x11, y8) is extracted as extracted image p4, an image included in the region of images (x14, y2) to (x11, y8) is extracted as extracted image p6, and an image included in the region of images (x12, y8) to (x22, y14) is extracted as extracted image p5.

(Physical Property Determination Processing)

Figure 16:
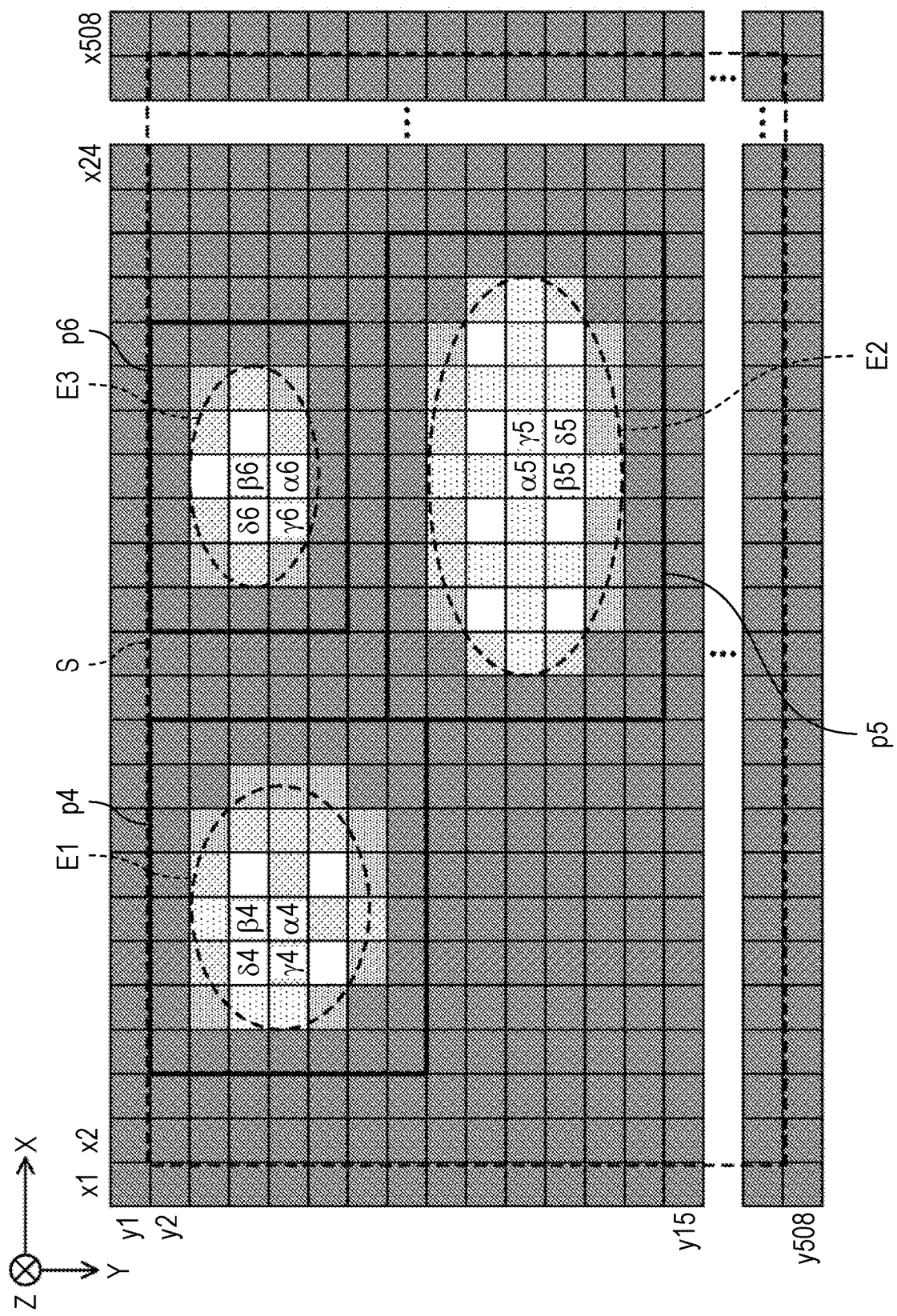
FIG. 16 is a diagram illustrating an example image of a sheet captured by the image sensor according to the second exemplary embodiment.
Figure 17:
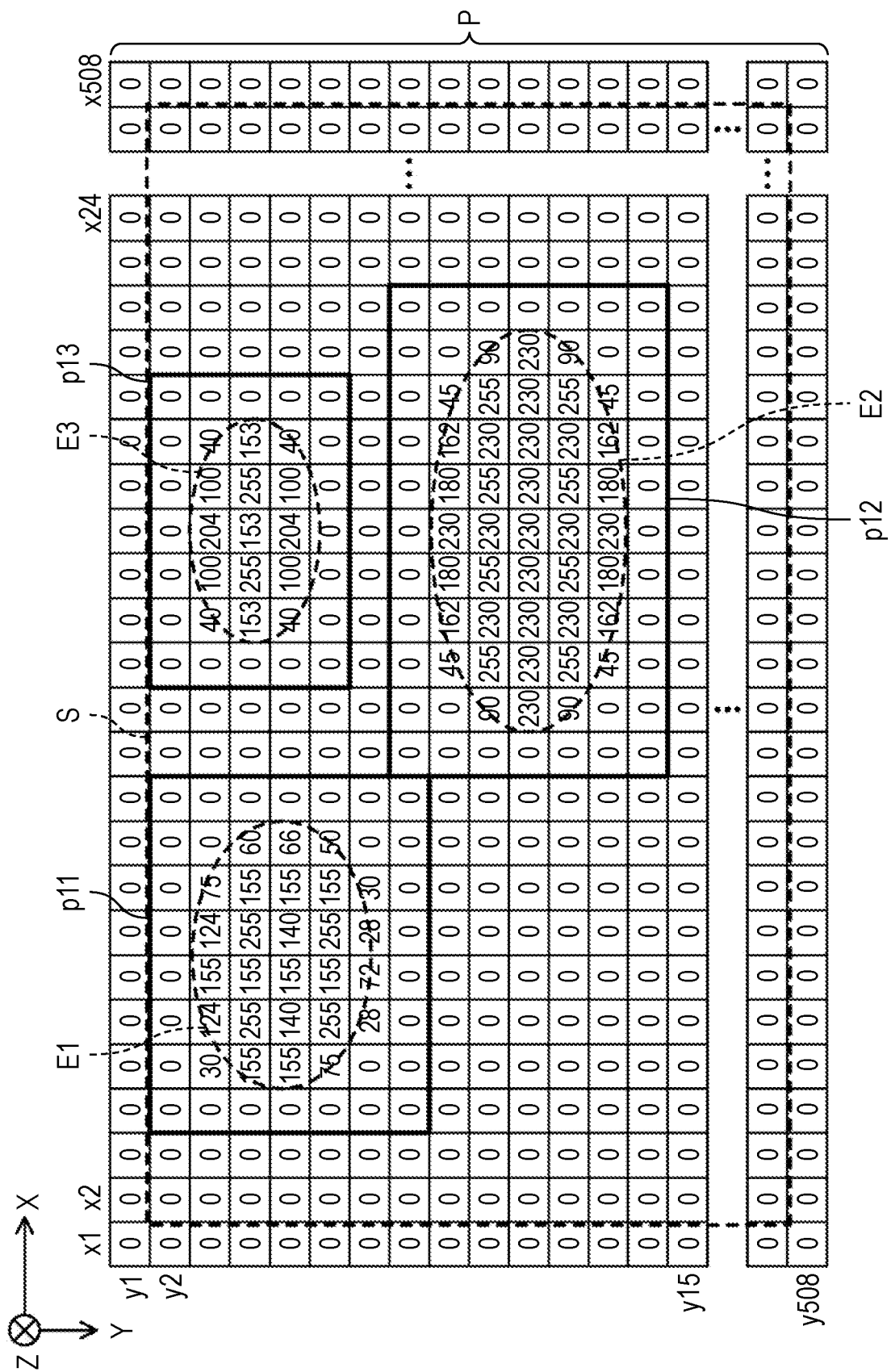
FIG. 17 is a diagram illustrating an example of luminance values of the sheet captured by the image sensor according to the second exemplary embodiment.
Figure 18:
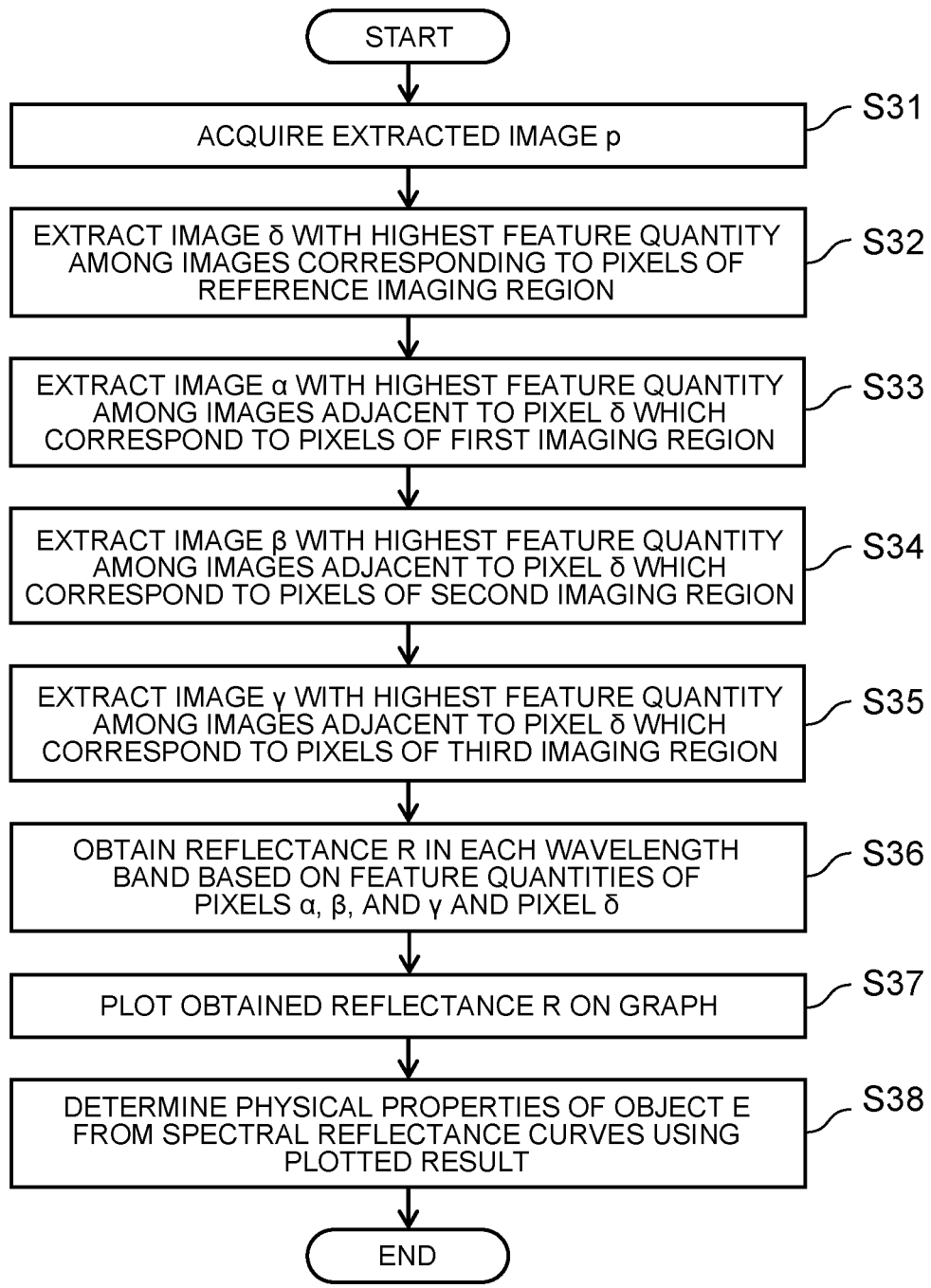
FIG. 18 is a flowchart depicting a flow of physical property determination processing of an image processing device according to the second exemplary embodiment.

Physical property determination processing (step S5) of image processing device 6 will be described with reference to FIGS. 16 to 19. FIG. 16 is a diagram illustrating an example image of sheet S captured by the image sensor according to the second exemplary embodiment. FIG. 17 is a diagram illustrating an example of luminance values of sheet S captured by the image sensor according to the second exemplary embodiment. FIG. 18 is a flowchart depicting a flow of physical property determination processing of the image processing device according to the second exemplary embodiment.

When acquiring extracted image p (extracted images p4 to p6 in FIG. 16) (step S31), image processing device 6 extracts image δ with the highest feature quantity among images included in extracted image p which correspond to pixels 10 of reference imaging region 14 (step S32).

Image processing device 6 extracts image α with the highest feature quantity among images adjacent to extracted image δ which correspond to pixels 10 of first imaging region 13 (step S33).

Image processing device 6 extracts image β with the highest feature quantity among the images adjacent to extracted image δ which correspond to pixels 10 of second imaging region 16 (step S34).

Image processing device 6 extracts image γ with the highest feature quantity among images adjacent to extracted image δ which correspond to pixels 10 of third imaging region 17 (step S35).

For example, in extracted image p4 of FIG. 16, an image (X6, Y4) (image δ4) corresponds to image δ with the highest feature quantity which is an image corresponding to pixel 10 of reference imaging region 14. An image (X7, Y5) (image α4) corresponds to a pixel with the highest feature quantity among images adjacent to image δ4 which correspond to pixels 10 of first imaging region 13. An image (X7, Y4) (image β4) corresponds to a pixel with the highest feature quantity among images adjacent to image δ4 which correspond to pixels 10 of second imaging region 16. An image (X6, Y5) (image γ4) corresponds to a pixel with the highest feature quantity among images adjacent to image δ4 which correspond to pixels 10 of third imaging region 17. Although not described in detail, in extracted image p5, images δ5, α5, β5, and γ5 correspond to respective images δ, α, β, and γ. In extracted image p6, images δ6, α6, β6, and γ6 correspond to respective images δ, α, β, and γ. Note that as a specific example, images α, β, and γ are extracted from the region adjacent to extracted image δ, but this is not a limitation.

After step S35, reflectances R11 to R13 of object E in the respective first wavelength band, second wavelength band, and third wavelength band are obtained based on the luminance values of image δ and images α, β, and γ (step S36). Specifically, the reflectance R11 can be obtained by (luminance value of image α)/(luminance value of image δ). The reflectance R12 can be obtained by (luminance value of image β)/(luminance value of image δ). The reflectance R13 can be obtained by (luminance value of image γ)/(luminance value of image δ).

Figure 19:
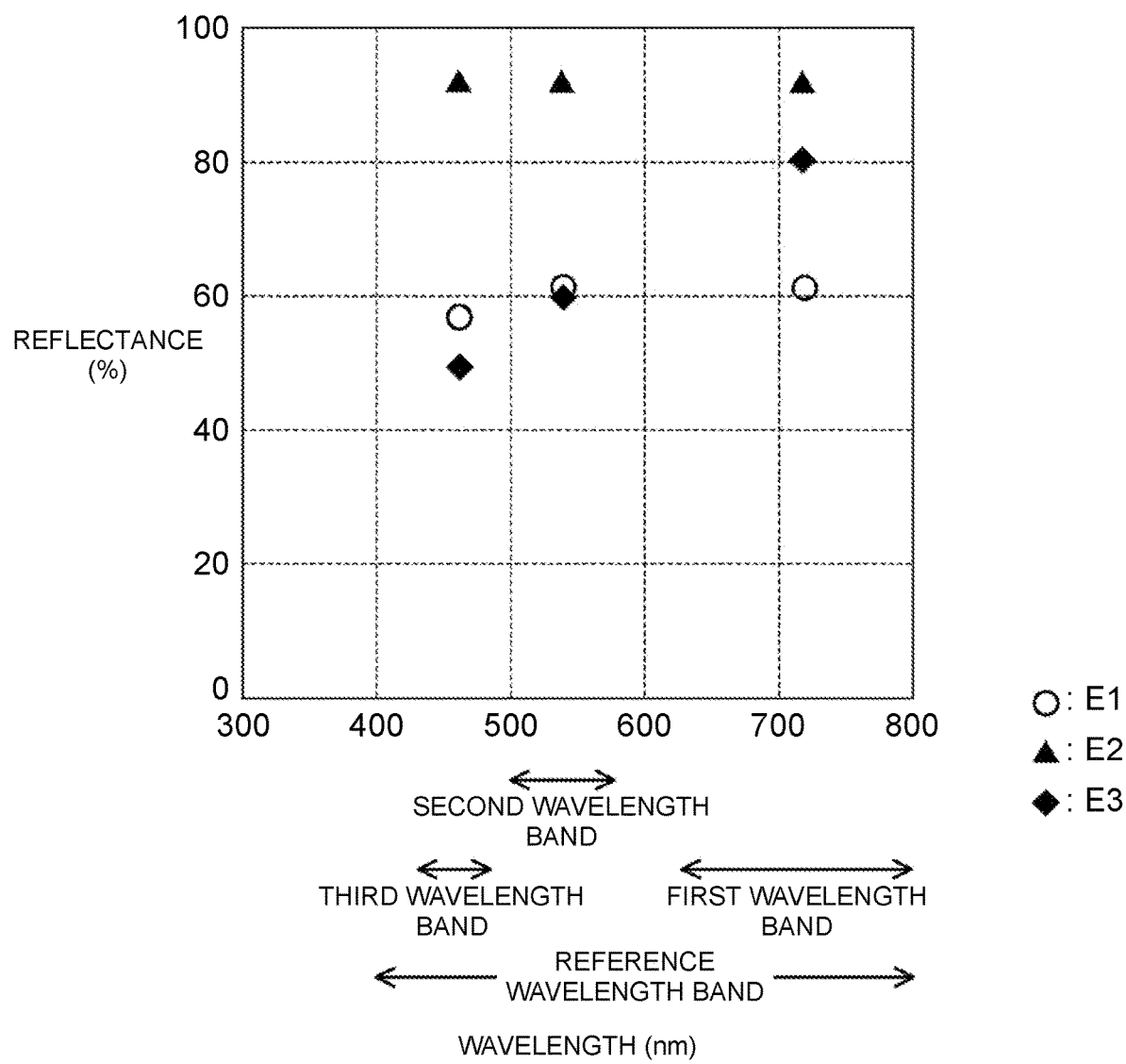
FIG. 19 is a diagram illustrating a graph in which reflectances are plotted according to the second exemplary embodiment.

For example, in FIG. 19, the reflectance R11 of object E1=155/255≈0.60, making the reflectance R11 of object E1 60%. The reflectance R12 of object E1=155/255≈0.60, making the reflectance R12 of object E1 60%. The reflectance R13 of object E1=140/255≈0.55, making the reflectance R13 of object E1 55%. The reflectances R11 to R13 can be obtained for respective objects E2, E3 in the same manner as in the following.

After step S36, the reflectances are plotted on a graph (step S37). The obtained reflectance R in each wavelength band is plotted on a graph with the wavelength on the X-axis and the reflectance R on the Y-axis. In the present exemplary embodiment, the reflectance R in each wavelength band is plotted as a median value of the wavelength band (refer to FIG. 19).

The plotted reflectances in FIG. 19 are compared with the spectral reflectance curves in FIG. 8, the closest spectral reflectance curve is selected from the correlation, and the physical properties of object E are determined based on the spectral reflectance curve (step S38). The reflectance plot of object E1 is closest to the spectral reflectance curve of Fe in FIG. 8. Therefore, image processing device 6 determines that object E1 is Fe. The reflectance plot of object E2 is closest to the spectral reflectance curve of Al in FIG. 8. Therefore, image processing device 6 determines that object E2 is Al. The reflectance plot of object E3 is closest to the spectral reflectance curve of Cu in FIG. 8. Therefore, image processing device 6 determines that object E3 is Cu.

(Image Correction Processing)

When acquiring extracted image p (p1 to p3) and reflectances R11 to R13 (R1 to R3), image processing device 6 corrects the image of extracted image p.

The image corresponding to pixels 10 in first imaging region 13, second imaging region 16, and third imaging region 17 has luminance values lower than those of the image corresponding to pixels 10 in reference imaging region 14. This is because pixels 10 of first imaging region 13, second imaging region 16, and third imaging region 17 generate a spectral image in wavelength bands which are narrower than the reference wavelength band. Therefore, by correcting the luminance values of the images corresponding to pixels 10 of first imaging region 13 to be about the same as the luminance values of the images corresponding to pixels 10 of reference imaging region 14, a clear image of object E can be acquired.

For example, the above correction can be performed by dividing the reflectance R11 by the luminance value of each image corresponding to pixels 10 of first imaging region 13, dividing the reflectance R12 by the luminance value of each image corresponding to pixels 10 of second imaging region 16, and dividing the reflectance R13 by the luminance value of each image corresponding to pixels 10 of third imaging region 17. By performing such correction on extracted images p1 to p3 from before correction, corrected images pw (pw1 to pw3) as illustrated in FIGS. 10B, 11B, and 12B can be generated.

OTHER EXEMPLARY EMBODIMENTS

In the above, exemplary embodiments have been described as illustrations of the technique disclosed in the present application. However, the technique in the present disclosure is not limited to the exemplary embodiments and is applicable to exemplary embodiments appropriately subjected to changes, replacements, additions, omissions, and the like.

Imaging device 1 and illumination device 2 are configured as a dark field optical system in the above exemplary embodiments, but may be configured as a bright field optical system. Furthermore, imaging device 1 is configured as a line sensor, but may be configured as an area sensor. In addition, image processing device 6 may generate a moving image or a still image from the pixel signal output from image sensor 11.

In the first exemplary embodiment, as illustrated in FIG. 3, adjacent pixels 10 are allocated to each of first imaging region 13 and reference imaging region 14, but the allocation of pixels 10 to first imaging region 13 and reference imaging region 14 is not limited as such. For example, a plurality of adjacent pixels 10 (e.g., 2×2 pixels 10) may be allocated to each of first imaging region 13 and reference imaging region 14. Furthermore, a single pixel 10 may be allocated to first imaging region 13, and pixels 10 surrounding pixel 10 may be allocated to reference imaging region 14. That is, first imaging region 13 and reference imaging region 14 may not be allocated to each single pixel 10. Note that in the second exemplary embodiment, similarly in first imaging region 13, reference imaging region 14, second imaging region 16, and third imaging region 17, the allocation of pixels 10 is not limited to the example of FIG. 15.

The arrangement of pixels 10 arranged in image sensor 11 is not limited to the above-described arrangement. In addition, the number of pixels of image sensor 11 is not limited to the above-described number.

An inspection apparatus according to another exemplary embodiment of the present disclosure is for detecting an object included in a body to be inspected. The inspection apparatus includes an image sensor and an image processing device. The image sensor includes a first imaging region, a second imaging region, and a reference imaging region. The first imaging region includes a plurality of first pixels which capture an image of the object in a first wavelength band and output a plurality of first feature quantities each of which corresponds to the plurality of first pixels. The second imaging region includes a plurality of second pixels which capture an image of the object in a second wavelength band and output a plurality of second feature quantities each of which corresponds to the plurality of second pixels. The reference imaging region includes a plurality of reference pixels which capture an image of the object in a reference wavelength band and output a plurality of reference feature quantities each of which corresponds to the plurality of reference pixels. The reference wavelength band overlaps with the first wavelength band and the second wavelength band. The image processing device obtains a first reflectance and a second reflectance of the object based on at least one of the plurality of first feature quantities, at least one of the plurality of second feature quantities, and at least one of the plurality of reference feature quantities, the first reflectance being a reflectance in the first wavelength band and the second reflectance being a reflectance in the second wavelength band; determines physical properties of the object based on the first reflectance and the second reflectance; corrects the image of the object generated according to output from the image sensor based on the at least one of the plurality of first feature quantities, the at least one of the plurality of second feature quantities, and the at least one of the plurality of reference feature quantities; and determines a size of the object based on the corrected image of the object.

According to the present disclosure, it is possible to determine the physical properties of an object while suppressing a decrease in resolution of an image obtained from an image sensor.

The inspection apparatus of the present disclosure can be used for inspection of foreign matter or defects included in members used for semiconductors, electronic devices, secondary batteries, and the like.

What is claimed is:

1. An inspection method for detecting an object included in a body to be inspected by capturing an image of the object with an inspection apparatus,
wherein
the inspection apparatus includes an image sensor,
the image sensor includes:
a first imaging region including a plurality of first pixels that capture a spectral image of the object in a first wavelength band and output a plurality of first feature quantities each of which corresponds to one of the plurality of first pixels; and
a reference imaging region including a plurality of reference pixels that capture a spectral image of the object in a reference wavelength band and output a plurality of reference feature quantities each of which corresponds to one of the plurality of reference pixels, the reference wavelength band overlapping with the first wavelength band,
the inspection method comprising:
calculating a first reflectance of the object based on at least one of the plurality of first feature quantities and at least one of the plurality of reference feature quantities, the first reflectance being a reflectance in the first wavelength band;
determining physical properties of the object based on the first reflectance; and
correcting the spectral image of the object generated according to output from the image sensor based on the at least one of the plurality of first feature quantities and the at least one of the plurality of reference feature quantities,
wherein the at least one of the plurality of first feature quantities is a maximum first feature quantity among the plurality of first feature quantities,
wherein the at least one of the plurality of reference feature quantities is a maximum reference feature quantity among the plurality of reference feature quantities, and
wherein the body to be inspected is a solid.

2. The inspection method according to claim 1, wherein, in the determining of the physical properties, the physical properties of the object are determined based on the first reflectance and spectral reflectance data indicating spectral reflectances of a plurality of substances.

3. The inspection method according to claim 2, wherein, in the determining of the physical properties, the physical properties of the object are determined by comparing the first reflectance to a threshold value set based on the spectral reflectance data.

4. The inspection method according to claim 1, wherein, in the correcting of the spectral image, the spectral image of the object is corrected by dividing the first reflectance by each of the plurality of first feature quantities.

5. The inspection method according to claim 1, further comprising determining a size of the object based on the spectral image of the object corrected in the correcting of the spectral image.

6. An inspection method for detecting an object included in a body to be inspected by capturing an image of the object with an inspection apparatus,
wherein
the inspection apparatus includes an image sensor,
the image sensor includes:
a first imaging region including a plurality of first pixels that capture a spectral image of the object in a first wavelength band and output a plurality of first feature quantities each of which corresponds to one of the plurality of first pixels;
a second imaging region including a plurality of second pixels that capture a spectral image of the object in a second wavelength band and output a plurality of second feature quantities each of which corresponds to one of the plurality of second pixels; and
a reference imaging region including a plurality of reference pixels that capture a spectral image of the object in a reference wavelength band and output a plurality of reference feature quantities each of which corresponds to one of the plurality of reference pixels, the reference wavelength band overlapping with the first wavelength band and the second wavelength band,
the inspection method comprising:
calculating a first reflectance and a second reflectance of the object based on at least one of the plurality of first feature quantities, at least one of the plurality of second feature quantities, and at least one of the plurality of reference feature quantities, the first reflectance being a reflectance in the first wavelength band and the second reflectance being a reflectance in the second wavelength band;
determining physical properties of the object based on the first reflectance and the second reflectance;
correcting the spectral image of the object generated according to output from the image sensor based on the at least one of the plurality of first feature quantities, the at least one of the plurality of second feature quantities, and the at least one of the plurality of reference feature quantities; and
determining a size of the object based on the spectral image of the object corrected in the correcting of the spectral image,
wherein the at least one of the plurality of first feature quantities is a maximum first feature quantity among the plurality of first feature quantities,
wherein the at least one of the plurality of reference feature quantities is a maximum reference feature quantity among the plurality of reference feature quantities, and
wherein the body to be inspected is a solid.

7. The inspection method according to claim 6, wherein, in the determining of the physical properties, the physical properties of the object are determined by comparing the first reflectance and the second reflectance to spectral reflectance data indicating spectral reflectances of a plurality of substances.

8. The inspection method according to claim 1, wherein the at least one of the first feature quantities is at least one of a luminance value or a brightness of the object captured by the image sensor.

9. An inspection apparatus for detecting an object included in a body to be inspected, the inspection apparatus comprising:
an image sensor; and
an image processing device,
wherein
the image sensor includes:
a first imaging region including a plurality of first pixels that capture a spectral image of the object in a first wavelength band and output a plurality of first feature quantities each of which corresponds to the plurality of first pixels; and
a reference imaging region including a plurality of reference pixels that capture a spectral image of the object in a reference wavelength band and output a plurality of reference feature quantities each of which corresponds to the plurality of reference pixels, the reference wavelength band overlapping with the first wavelength band, the image processing device obtains a first reflectance of the object based on at least one of the plurality of first feature quantities and at least one of the plurality of reference feature quantities, the first reflectance being a reflectance in the first wavelength band, determines physical properties of the object based on the first reflectance, corrects the spectral image of the object generated according to output from the image sensor based on the at least one of the plurality of first feature quantities and the at least one of the plurality of reference feature quantities, and determines a size of the object based on the corrected spectral image of the object, wherein the at least one of the plurality of first feature quantities is a maximum first feature quantity among the plurality of first feature quantities, wherein the at least one of the plurality of reference feature quantities is a maximum reference feature quantity among the plurality of reference feature quantities, and wherein the body to be inspected is a solid.

* * * * *